United States Patent
Lin et al.

(10) Patent No.: US 12,408,055 B2
(45) Date of Patent: Sep. 2, 2025

(54) INTELLIGENT NR OBJECT PRIORITIZATION FOR 5G SERVICE

(71) Applicant: Apple Inc., Cupertino, CA (US)

(72) Inventors: ChunLei Lin, Hong Kong (HK); Bin Feng, Beijing (CN); Vijay Venkataraman, San Jose, CA (US); Alosious Pradeep Prabhakar, Singapore (SG)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 18/189,788

(22) Filed: Mar. 24, 2023

(65) Prior Publication Data

US 2023/0319611 A1 Oct. 5, 2023

Related U.S. Application Data

(60) Provisional application No. 63/327,467, filed on Apr. 5, 2022.

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 11,445,395 B2 | 9/2022 | Xue | |
| 2015/0327286 A1* | 11/2015 | Yiu | H04W 72/27 370/328 |
| 2018/0026903 A1* | 1/2018 | Kotreka | H04W 76/34 370/311 |
| 2018/0063765 A1* | 3/2018 | Bansal | H04W 24/02 |
| 2021/0360464 A1* | 11/2021 | Zheng | H04W 52/0209 |
| 2022/0167453 A1* | 5/2022 | Liu | H04W 76/15 |
| 2022/0232439 A1* | 7/2022 | Lee | H04W 36/008375 |

(Continued)

FOREIGN PATENT DOCUMENTS

CN 101299866 11/2008
WO 2022056711 3/2022

*Primary Examiner* — Brian S Roberts
(74) *Attorney, Agent, or Firm* — Kowert, Hood, Munyon, Rankin & Goetzel, P.C.

(57) ABSTRACT

Techniques and wireless devices to perform adaptive measurement object prioritization in a cellular communication scenario. A wireless link is established by the wireless device with a serving cell of a cellular base station. Adaptive measurement object prioritization is implemented responsive to determining that a trigger condition has occurred. A configuration message is received from the base station, where the configuration indicates a plurality of measurement objects including both Long Term Evolution (LTE) and New Radio (NR) measurement objects. A first measurement object of the plurality of measurement objects is selected to prioritize for measurement. The first measurement object is measured during a first measurement gap prior to measuring one or more second measurement objects of the plurality of measurement objects, and a measurement report is provided to the serving cell specifying a measurement result of the first measurement object.

20 Claims, 25 Drawing Sheets

(56) References Cited

U.S. PATENT DOCUMENTS

2023/0143060 A1* 5/2023 Ramachandra ....... H04W 24/10
                                                    370/252
2023/0269638 A1* 8/2023 Raghavan ............. H04W 24/08
                                                    370/252

* cited by examiner

| Input | | Output | |
|---|---|---|---|
| Serving Cell Frequency | RSRP(dBm) | Timer Length(s) | Counter MAX |
| f<1300MHz | RSRP<-110 | 0 | 0 |
| | -100<RSRP<-110 | 3 | 2 |
| | -100<RSRP | 5 | 3 |
| 1300MHz<f<3000MHz | RSRP<-110 | 0 | 0 |
| | -95<RSRP<-110 | 2 | 1 |
| | -95<RSRP | 4 | 2 |
| f<3000MHz | RSRP<-110 | 0 | 0 |
| | -90<RSRP<-110 | 2 | 1 |
| | -90<RSRP | 3 | 2 |

FIG. 9

| Parameters | | NR ARFCN | SCS | Frequency Range | Bandwidth | Meas Gap Config/Pattern | | Priority Verdict |
|---|---|---|---|---|---|---|---|---|
| | | | | | | Per-UE (or) per-FR | MGL | |
| NRMeasObject Details | | 639936 (n78) | 30KHz | FR1 | 100MHz | per-UE | 6ms | 1 |
| | | 430830 (n1) | 15KHz | FR1 | 10MHz | per-UE | 6ms | 4 |
| | | 504990 (n41) | 30KHz | FR1 | 60MHz | per-UE | 4ms | 3 |
| | | n257 | 60KHz | FR2 | 400MHz | per-UE | 1.5ms | 2 |

FIG. 20A

| Parameters | | NR ARFCN | SCS | Frequency Range | Bandwidth | Meas Gap Config/Pattern | | Priority Verdict |
|---|---|---|---|---|---|---|---|---|
| | | | | | | Per-UE (or) per-FR | MGL | |
| NRMeasObject Details | | 639936 (n78) | 30KHz | FR1 | 100MHz | per-FR (gap FR1) | 6ms | 1 |
| | | 430830 (n1) | 15KHz | FR1 | 10MHz | per-FR (gap FR1) | 6ms | 4 |
| | | 504990 (n41) | 30KHz | FR1 | 60MHz | per-FR (gap FR1) | 4ms | 2 |
| | | n257 | 60KHz | FR2 | 400MHz | per-FR (gap FR2) | 1.5ms | 3 |

*FIG. 20B*

FR1 Candidate Table:

| NR FR1 MR Obj # | ARFCN | BW | FDD/TDD |
|---|---|---|---|
| NR 1 | ARFCN 1 | 100MHz | TDD |
| NR 2 | ARFCN 2 | 60MHz | TDD |
| NR 3 | ARFCN 2 | 20MHz | TDD |

FIG. 22

FR2 Candidate Table:

| NR FR2 MR Obj # | ARFCN | BW | FDD/TDD |
|---|---|---|---|
| NR 4 | ARFCN 4 | 100MHz | TDD |
| NR 5 | ARFCN 5 | 60MHz | TDD |
| NR 6 | ARFCN 6 | 20MHz | TDD |

FIG. 23

INTELLIGENT NR OBJECT PRIORITIZATION FOR 5G SERVICE

PRIORITY INFORMATION

This application claims benefit of priority to Provisional Application No. 63/327,467, titled "Intelligent NR Object Prioritization for 5G Service", and filed Apr. 5, 2022, which is hereby incorporated by reference in its entirety as though fully and completely set forth herein.

FIELD

The present application relates to wireless communications, and more particularly to systems, apparatuses, and methods for a wireless device to dynamically prioritize measurement objects in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include UMTS (associated with, for example, WCDMA or TD-SCDMA air interfaces), LTE, LTE Advanced (LTE-A), NR, HSPA, IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, UE devices increasingly operate in hybrid communication scenarios, where the UE transitions between communication configurations with one or more different radio access technologies (RATs). In such transition scenarios, it is desirable to reduce latency in switching between communication scenarios. Accordingly, improvements in the field are desired.

SUMMARY

Embodiments are presented herein of, inter alia, apparatuses, systems, and methods for a wireless device to implement adaptive measurement object prioritization in a wireless communication system. A wireless device such as a user equipment (UE) may include one or more antennas, one or more radios operably coupled to the one or more antennas, and a processor operably coupled to the one or more radios. The wireless device may be configured to communicate with a network over multiple radio access technologies, for example, over both Long Term Evolution (LTE) and New Radio (NR), in an Evolved Universal Terrestrial Radio Access-New Radio (E-UTRA NR) Dual Connectivity (EN-DC) scenario.

In some embodiments, a wireless link is established with a serving cell of a cellular base station. Adaptive measurement object prioritization may be implemented responsive to determining that a trigger condition has occurred. A configuration message is received from the base station, where the configuration indicates a plurality of measurement objects including both LTE and NR measurement objects. A first measurement object of the plurality of measurement objects may be selected to prioritize for measurement.

In some embodiments, the first measurement object is measured during a first measurement gap prior to measuring one or more second measurement objects of the plurality of measurement objects, and a measurement report is provided to the serving cell specifying a measurement result of the first measurement object.

Note that the techniques described herein may be implemented in and/or used with a number of different types of devices, including but not limited to cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9 is a table illustrating example timer length and maximum measurement counter values for different radio conditions, according to some embodiments;

FIGS. 20A-B are example priority tables for four distinct NR measurement objects, according to some embodiments;

FIG. 22 is a frequency range 1 (FR1) candidate table, according to some embodiments;

FIG. 23 is a frequency range 2 (FR2) candidate table, according to some embodiments;

Figure 1:
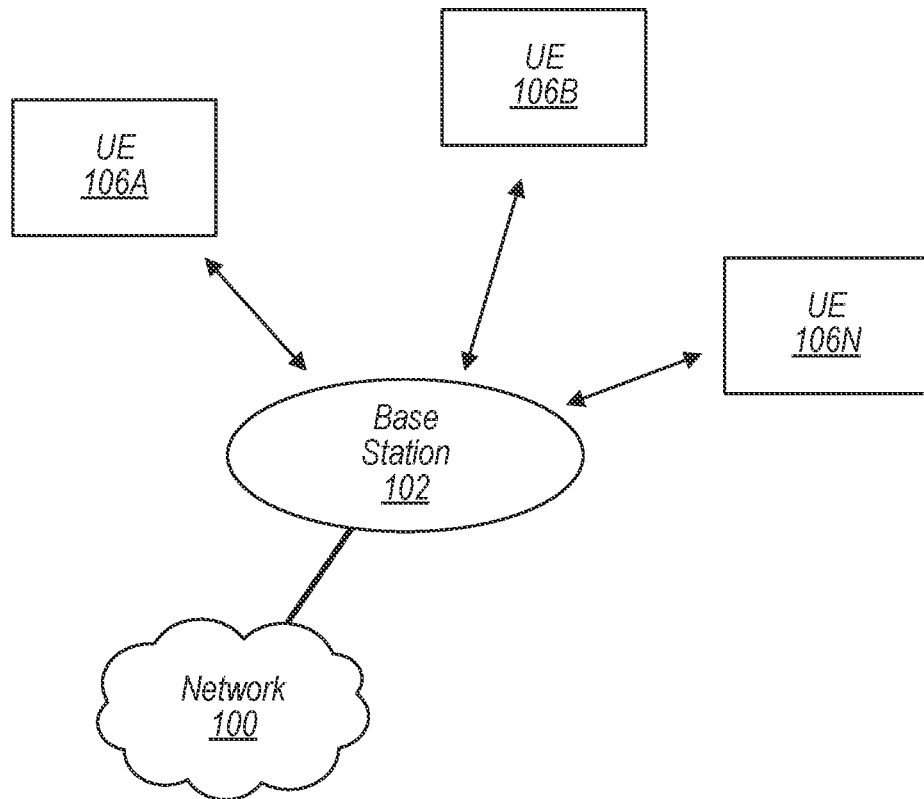
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
UMTS: Universal Mobile Telecommunication System
LTE: Long Tenn Evolution
NR: New Radio
TX: Transmission/Transmit
RX: Reception/Receive
RAT: Radio Access Technology
TRP: Transmission-Reception-Point
DCI: Downlink Control Information
CSI: Channel State Information
CSI-RS: Channel State Information Reference Signals
CSI-IM: Channel State Information Interference Management
CMR: Channel Measurement Resource
IMR: Interference Measurement Resource
CQI: Channel Quality Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
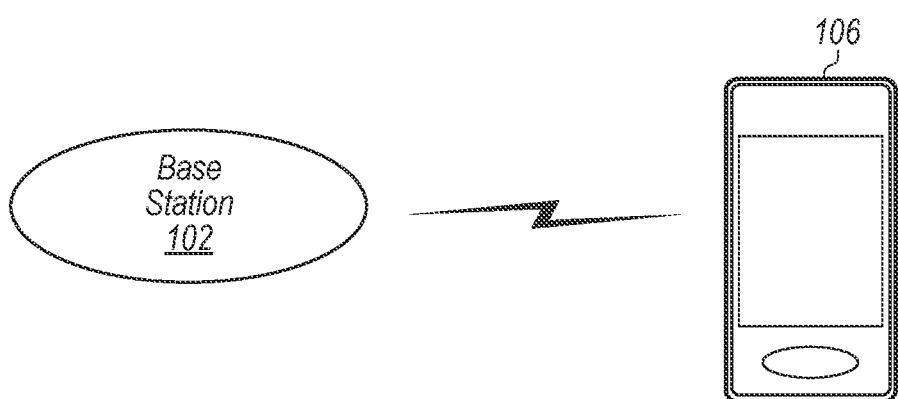
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as UMTS (WCDMA), LTE, LTE-Advanced (LTE-A), LAA/LTE-U, 5G NR, Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for autonomously performing certain cell measurements in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or NR (or LTE, NR and/or other RATs), and separate radios for communicating using each of Wi-Fi and BLUETOOTH™. Other configurations are also possible.

Figure 3:
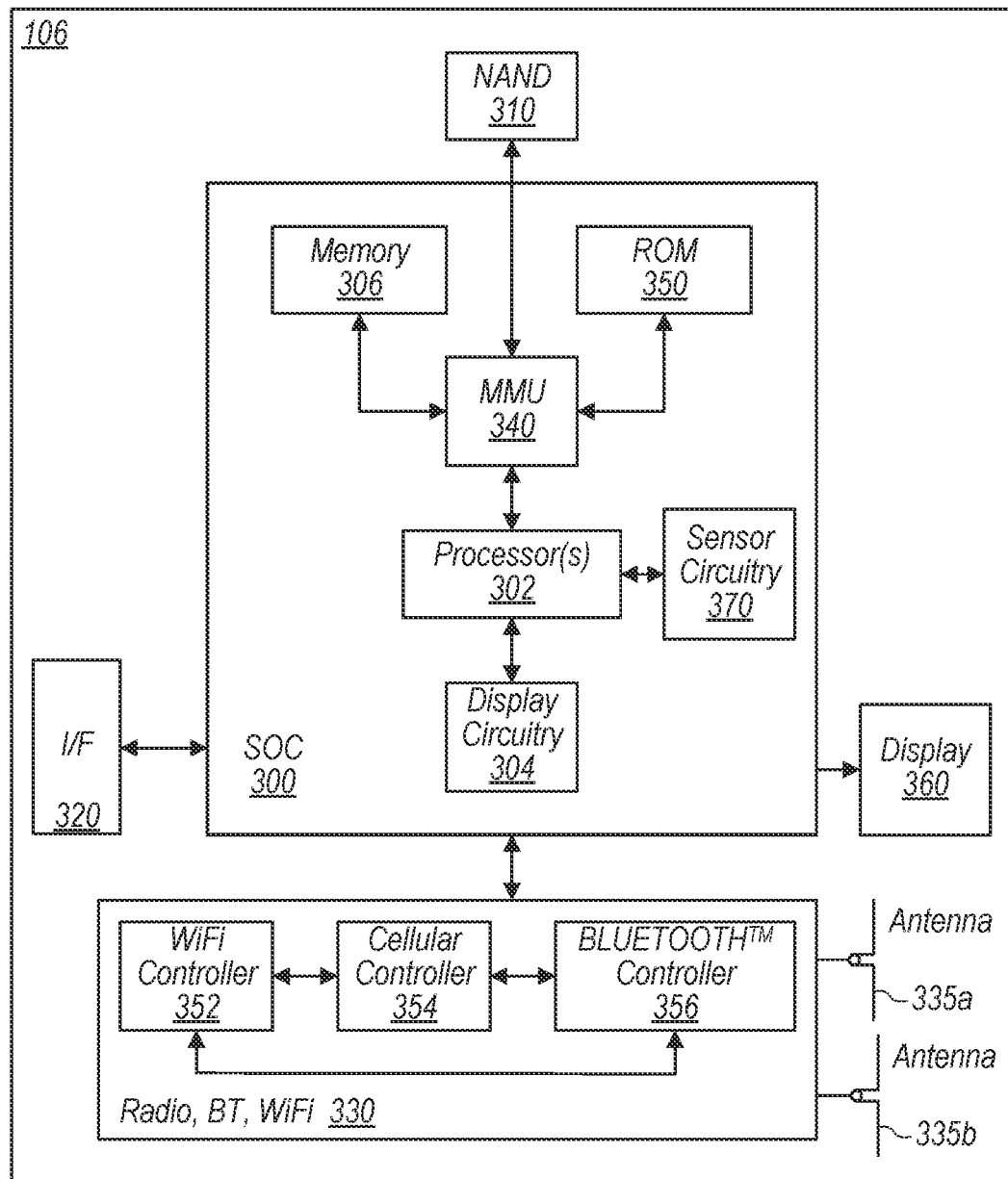
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to autonomously perform certain cell measurements in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to autonomously perform certain cell measurements in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
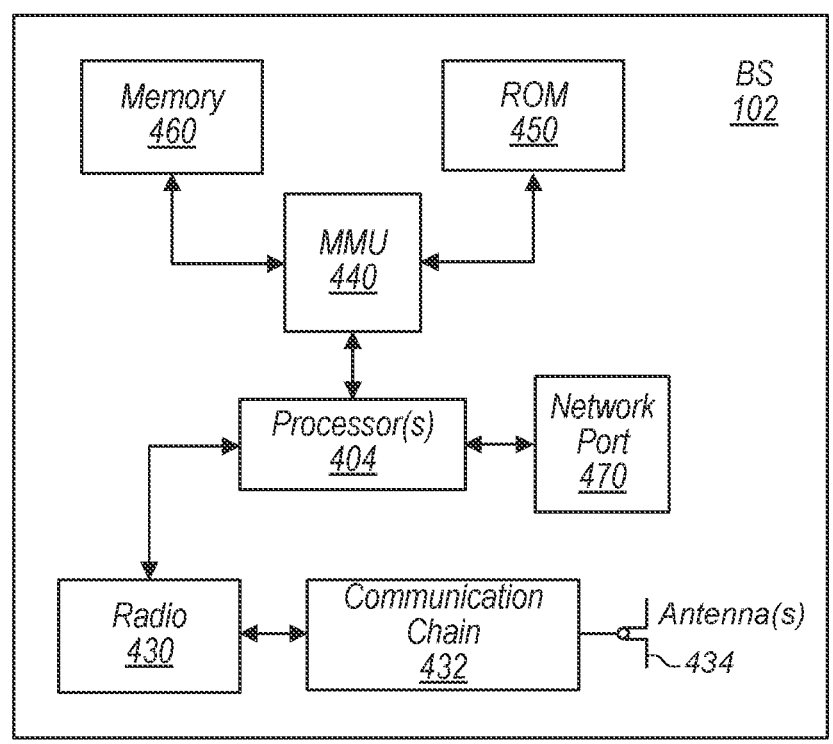
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Channel State Information

A wireless device, such as a user equipment, may be configured to measure a measurement object to determine the quality of a downlink and/or uplink channel and report information related to this quality measurement to the base station. One example of providing measurement reporting is that the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality. Cell measurements may also be performed on neighbor cells at various times.

In most cellular systems, the base station transmits a pilot signal (or a reference signal), such as channel state information reference signals (CSI-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and enerated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to he high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

Adaptive Measurement Object Prioritization

In some cellular deployments, a UE such as the UE 106 may operate in a non-standalone (NSA) mode, where it simultaneously communicates with both an LTE eNB and an NR gNB. Typically, an LTE cell serves as a Master Cell Group (MCG), whereas one or more NR cells serve as Secondary Cell Groups (SCGs). During operation, various scenarios may arise (described in detail below) where the UE temporarily drops the NR SCGs and switches to operating in a standalone (SA) mode with the LTE cell only. In these scenarios, at a subsequent time a process may be initiated for the UE to reconnect with one or more NR SCGs. For example, the NW may transmit an RRCConnectionReconfiguration message to the UE to configure the UE with multiple LTE inter frequency and NR measurement objects. The LTE and NR measurement objects may be subsequently measured by the UE to determine the suitability of one or more LTE and NR cells on which to establish or reestablish a connection.

Figures 5, 6:
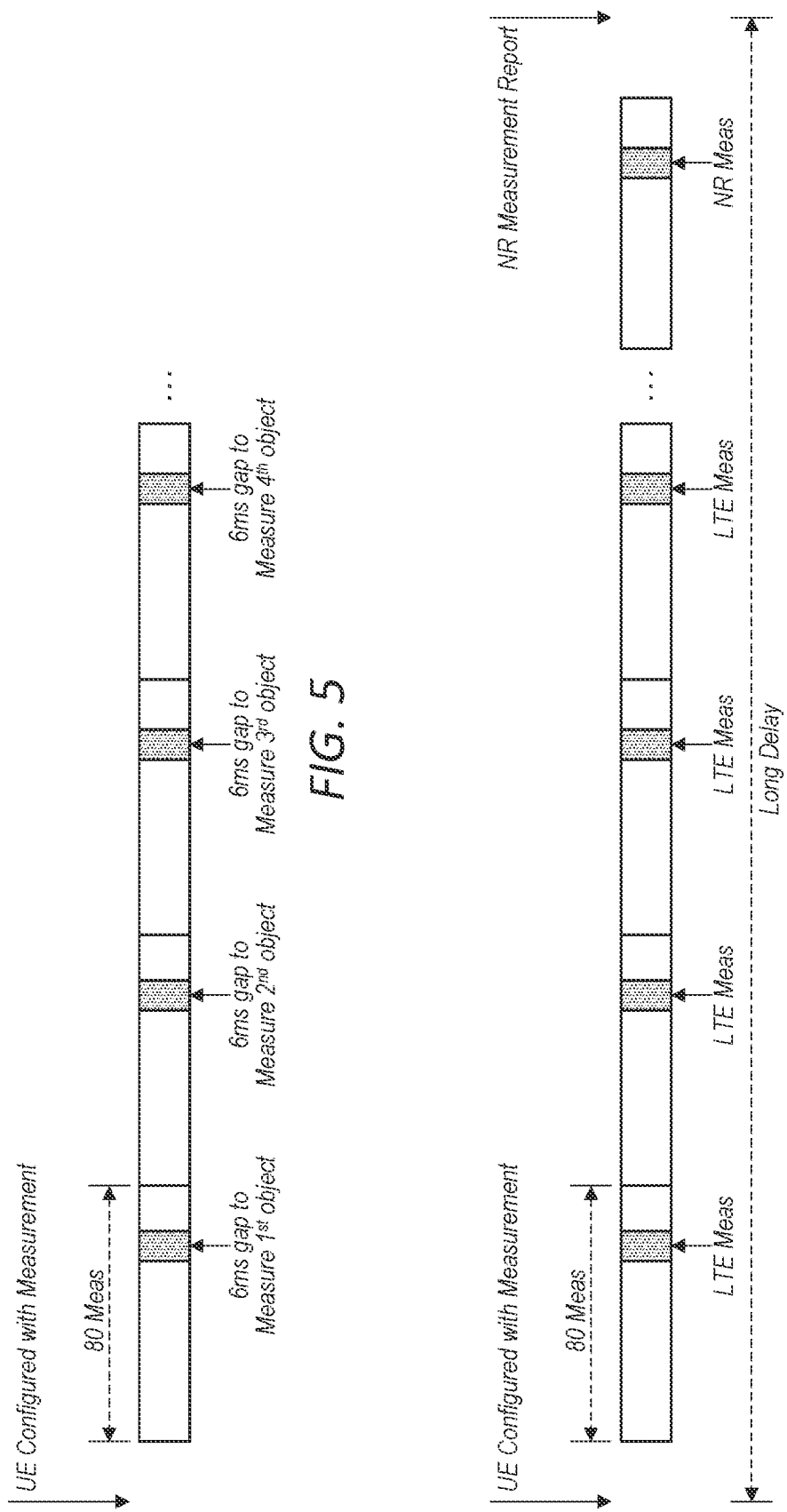
FIG. 5 is a schematic illustration of performing measurements on measurement objects during measurement gaps, according to some embodiments.
FIG. 6 is a schematic illustration of performing measurements on Long Term Evolution (LTE) measurement objects prior to New Radio (NR) measurement objects, according to the prior art.

The UE may use measurement gaps to perform the measurements, where the measurement gaps are typically of length 6 ms with a periodicity 40 ms or 80 ms (although other durations and/or periodicities are also possible. For example, as shown in FIG. 5, four measurement objects are sequentially measured during respective 6 ms gaps with a periodicity of 80 ms. Typically, in current implementations and as shown in FIG. 6, the UE measures the LTE measurement objects first, followed by measurement of the NR measurement objects. However, in some scenarios, performing the LTE measurements prior to the NR measurements may result in an undesirable user experience, by delaying and potentially interfering with the establishment of NR connectivity for the UE.

For example, in one scenario (Scenario 1), a UE may be operating in a dual-SIM dual-standby (DSDS) mode with a first data SIM (SIM1) and a second non-data SIM (SIM2). The UE may be currently camping on LTE with SIM2 as a non-data SIM. If the user switches from SIM2 to SIM1, the UE may perform an attach procedure with the network to add an NR SCG bearer to accommodate the additional data throughput. In this case, a delay may be incurred before the user establishes the NR connection for the data service, since SIM2 will perform measurements for LTE objects first, prior to measuring the NR measurement objects which are utilized to establish the NR connection. In some deployments, the network may release the NR measurement(s) if the UE doesn't send NR a measurement report within a certain time (eg, 3 s for China Unicom™) When the UE waits to perform NR measurements after completion of LTE measurements, the NR measurement may be interrupted by TAU/VoLTE measurements for the other SIM, which may cause the UE to not be able to measure the NR neighbour cell before the NW releases the NR measurement. In this case, the UE may be unsuccessful in acquiring data service after switching to SIM1. This scenario is described in further detail, for example, in FIGS. 10 and 11.

Another scenario where it may be undesirable to prioritize LTE measurements over NR measurements is in the context of Evolved Packet System (EPS) fallback (Scenario 2). During an EPS fallback scenario, a UE drops its NR standalone (SA) connection to attach to an LTE cell and perform an Internet Protocol (IP) Multimedia Subsystem (IMS) voice call on LTE only. After the voice call is complete, the LTE NW will send the UE a RRCConnectionReconfiguration message with a measurement configuration, and the UE may be expected to perform NR measurements and camp back onto the NR network in SA mode as soon as possible. Accordingly, the user experience may be improved in this scenario if NR measurements are prioritized to be performed before LTE measurements, so that the UE may re-establish the NR connection more quickly after finishing the voice call. This scenario is described in further detail, for example, in FIGS. 12 and 13.

In a third scenario (Scenario 3), for NSA Voice-over LTE (VoLTE), the VoITE call may be initiated in NSA mode and the NW may release the NR SCG before the VoLTE is established. After the voice call completes, LTE NW will send UE RRCConnectionReconfiguration message with a measurement configuration, and the UE may be expected to perform NR measurements and re-establish a connection with the NR SCG as soon as possible. This scenario is described in further detail, for example, in FIGS. 14 and 15.

A fourth scenario (Scenario 4) may arise where a user switches UE between a data-off mode and a data-on mode. For example, in a roaming scenario, a user may switch to data-on only when needed, to save the expense of roaming data. In a non-roaming scenario, a user may switch data off if the UE is close to running out of subscribed data packet, and switch data back to data-on when desired. In either a roaming or non-roaming scenario, after data is switched from "off" to "on" in the NSA network, the UE may be expected to perform NR measurements and add the NR SCG as soon as possible. This scenario is described in further detail, for example, in FIGS. 16 and 17.

A fifth scenario (Scenario 5) may arise where the UE has ongoing data transfers with high UL and/or DL throughput (e.g., one or both of UL and/or DL data throughput may be greater than a predetermined threshold level, or a buffer status report (BSR) may indicate a large quantity of upcoming UL data to be transmitted). In this scenario, upon receiving a RRCConnectionReconfiguration message with both LTE and NR measurement objects, the UE may be expected to perform NR measurements and add the NR SCG as soon as possible. This scenario is described in further detail, for example, in FIGS. 18 and 19.

In each of these scenarios, legacy L1 measurement scheduling doesn't put NR measurement object to the highest (i.e., first) priority, which may add extra delay in providing the NR measurement report, to trigger the NW add the NR SCG.

To address these and other concerns, in some embodiments adaptive prioritization is utilized between LTE measurement objects and NR measurement objects for a UE dual-RAT communication environment. The adaptive prioritization may be performed based on serving cell RF conditions, and may shorten the delay of NR SCG addition for scenarios where the UE is expected to provide the NR measurement report in a short period of time to acquire NR service.

Figure 7:
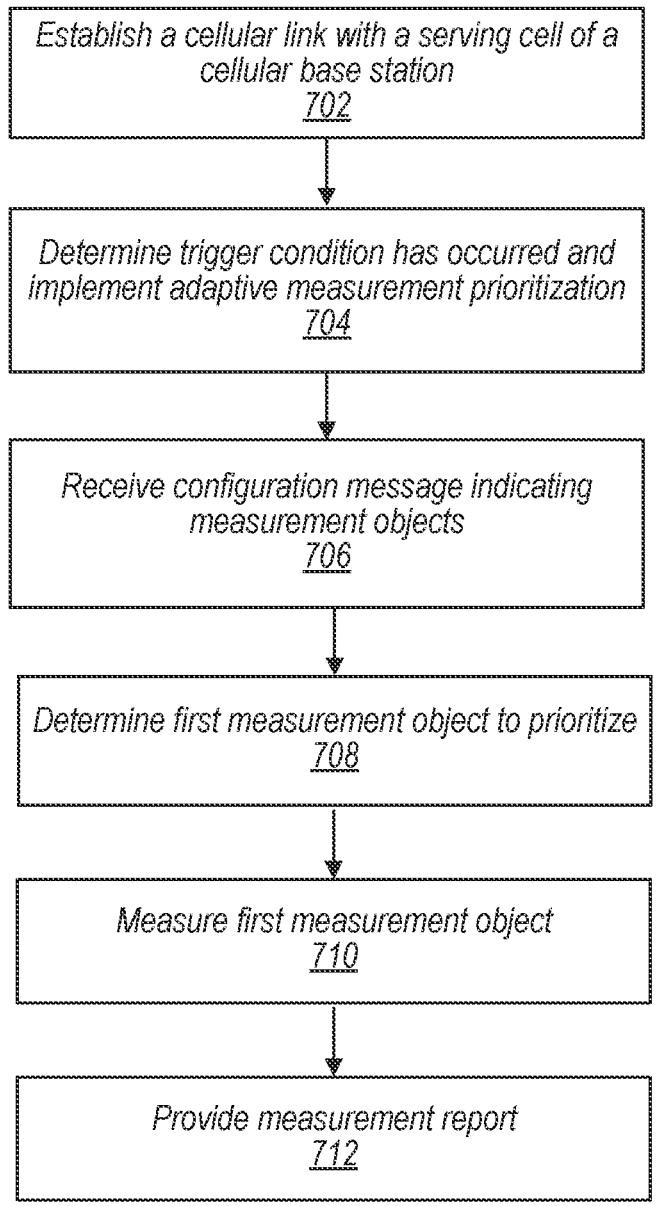
FIG. 7 is a flowchart diagram illustrating a method for implementing adaptive measurement object prioritization, according to some embodiments.

FIG. 7—Adaptive Prioritization for Measurement Objects

It is common in cellular communication for a cellular base station to facilitate cell measurements to be performed by a wireless enabled device that is attached to a cell provided by that cellular base station, at least at certain times. For example, the cellular base station may schedule a wireless enabled device to perform serving cell measurements for a serving cell provided by the cellular base station and/or neighbor cell measurements for certain neighbor cells at various times, which may operate according to the same radio access technology as the serving cell, or may operate according to a different radio access technology as the serving cell.

Embodiments herein describe systems, devices and methods for a UE to adaptively prioritize certain NR measurement objects to be measured before LTE measurement objects, at least in some scenarios. To illustrate one such possible set of techniques, FIG. 7 is a flowchart diagram illustrating a method for a wireless device to adaptively prioritize measurement objects in a wireless communication system, at least according to some embodiments.

Aspects of the method of FIG. 7 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 7 are described in a manner relating to the use of communication techniques and/or features associated with 3GPP, LTE and/or NR specification documents, such description is not intended to be limiting to the disclosure, and aspects of the method of FIG. 7 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

In 702, the wireless device may establish a wireless link with a serving cell of a cellular base station. The wireless link may be established according to a first radio access technology (RAT). According to some embodiments, the wireless link may include an LTE-based cellular link, in which case the wireless enabled device will be connected to an eNB. As another possibility, the wireless link may include a 5G NR cellular link, in which case the wireless enabled device will be connected to a gNB. Other types of cellular links are also possible, and the cellular network may also or alternatively operate according to another cellular communication technology (e.g., UMTS, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In some embodiments, the established connection is an Evolved Universal Terrestrial Radio Access-New Radio (E-UTRA NR) Dual Connectivity (EN-DC) connection, where the UE is connected to both an LTE cell as a master cell group (MCG) and one or more NR cells as one or more respective secondary cell groups (SCGs).

At least in some instances, establishing the wireless link(s) may include the wireless device providing capability information for the wireless device. Such capability information may include information relating to any of a variety of types of wireless device capabilities.

Figure 8A:
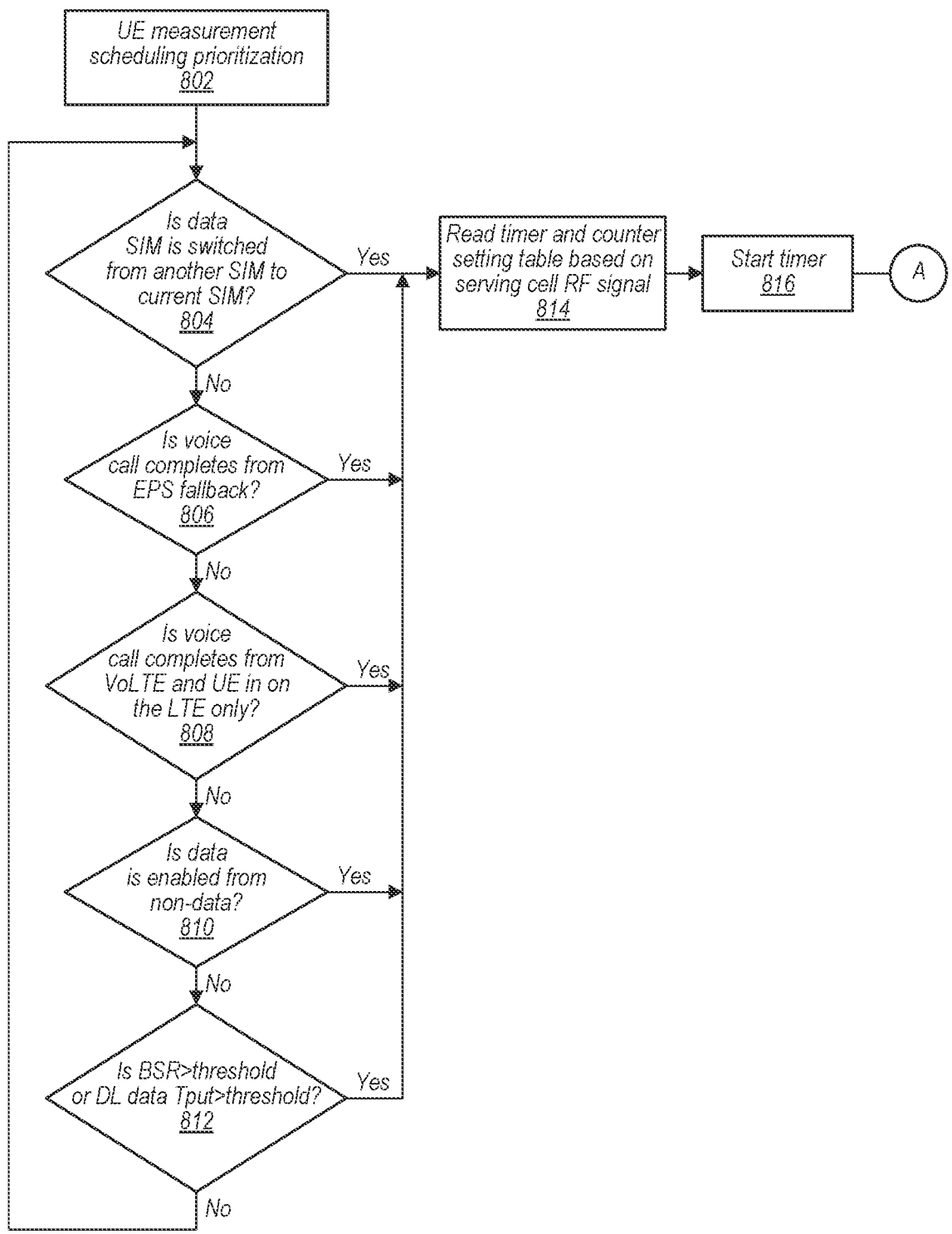
FIGS. 8A-B are a flowchart diagram illustrating trigger conditions and methods for implementing measurement object prioritization, according to some embodiments.
Figure 8B:
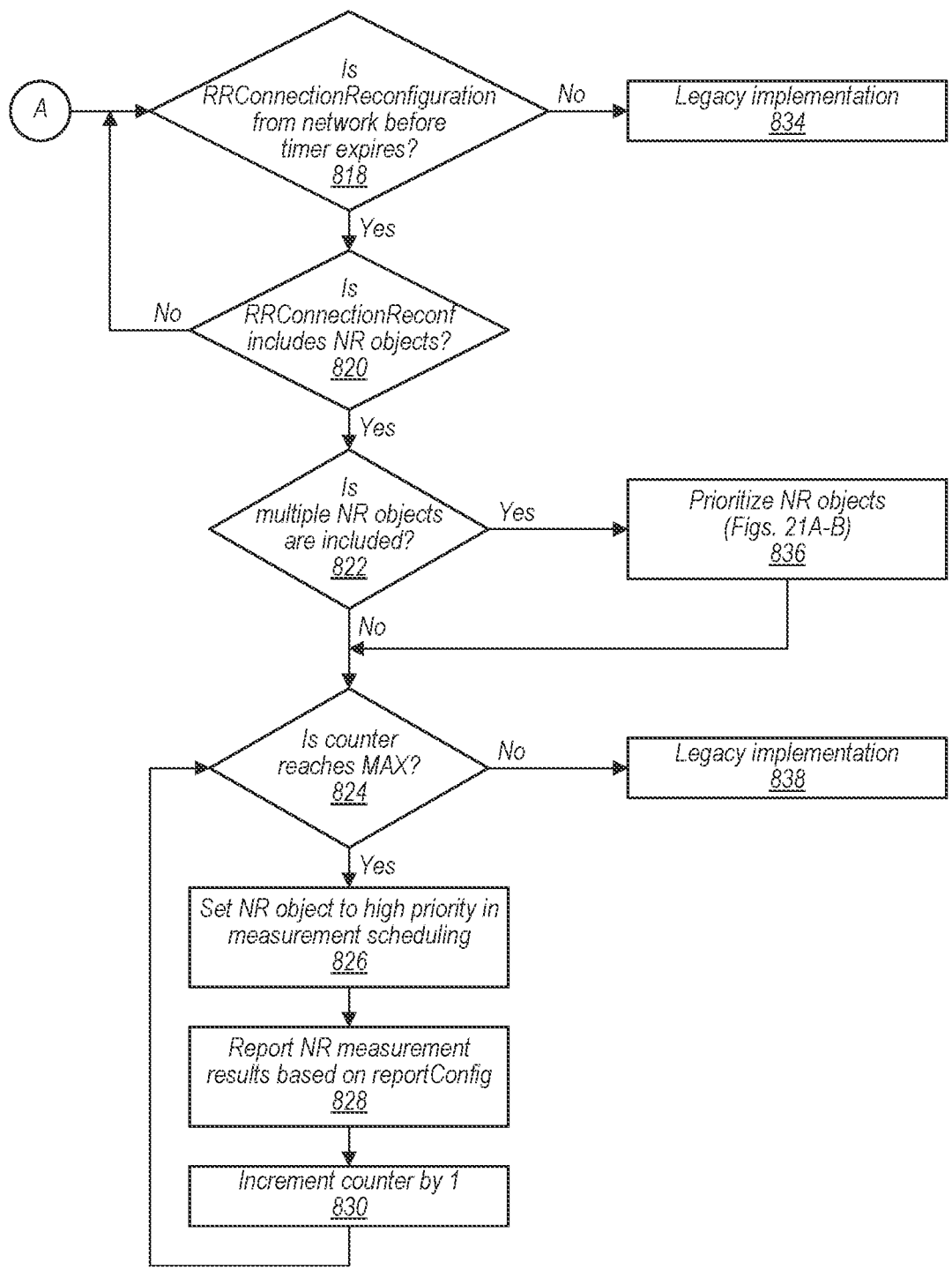

At 702, it is determined that a trigger condition has occurred to implement adaptive measurement object prioritization. In various embodiments, the trigger condition may include one of the wireless device switching from using a first non-data subscriber identity module (SIM) to a second data SIM, an evolved packet system (EPS) fallback procedure after completion of a Long Term Evolution (LTE) voice call, completion of a voice-over LTE (VoLTE) call, the wireless device switching from a data-off mode to a data-on mode, a determination that download data throughput exceeds a throughput threshold, or a determination that a buffer status report (BSR) exceeds a BSR threshold. FIGS. 8A-B illustrate a flowchart diagram showing various trigger conditions (e.g., steps 804-812) that may initiate adaptive measurement scheduling prioritization.

Adaptative measurement object prioritization is implemented responsive to determining that the trigger condition has occurred. In various embodiments, implementing the adaptive prioritization procedure includes one or both of initiating a timer and setting a maximum number of measurements to perform on a determined priority measurement object. The timer may be used to establish a window of time, where a first measurement object will be determined for prioritization on the condition that a configuration message is received before the timer expires. Note that, as used herein, "prioritization" refers to temporal prioritization, in that a prioritized measurement object will be measured prior to measuring other measurement objects indicated in a configuration message received from the base station.

In some embodiments, a duration of the timer is determined based at least in part on radio conditions of the serving cell. For example, one or both of a serving cell frequency of the serving cell and a received-signal-to-received-power (RSRP) ratio of the serving cell may be used to determine the duration of the timer. FIG. 9 is a table listing a set of example timer values for various serving cell frequencies and RSRP value ranges. The listed examples in FIG. 9 are exemplary only, and are not intended to be limiting to the disclosure. In general, a lower serving cell frequency determines a higher timer duration than a higher serving cell frequency. This may be advantageous, for example, because higher serving cell frequencies are more sensitive to mobility and may benefit from a shorter timer window (e.g., because UE mobility may cause a UE to move out of range of the serving cell more quickly for a higher serving cell frequency). Additionally, a lower RSRP ratio determines a lower timer duration than a higher RSRP ratio, as a lower RSRP may be more likely to lead to a loss of connection during a larger timer duration (in which case it may be desirable to abort adaptive prioritization). In some embodiments, the duration of the timer is determined to be zero when the RSRP ratio is lower than a threshold value.

Similar to the determination of the timer value, a maximum counter value for performing measurements on the prioritized measurement object may likewise be determined based on one or more radio conditions of the serving cell. Measuring the prioritized measurement object may be performed a number of times up to the maximum counter value (i.e., until the measurement is successful or the maximum number of attempts has been performed). For example, as also illustrated in FIG. 9, a lower serving cell frequency determines a higher maximum number of measurements than a higher serving cell frequency, whereas a lower RSRP ratio determines a lower the maximum number of measurements than a higher RSRP ratio. In some embodiments, the maximum number of measurements is determined to be zero when the RSRP ratio is lower than a threshold value.

At 704, a configuration message is received from the base station, wherein the configuration indicates a plurality of measurement objects. The plurality of measurement objects may include one or more LTE measurement objects and/or one or more 5G NR measurement objects. The configuration message may be an RRCConnectionReconfiguration message.

At 706, a first measurement object of the plurality of measurement objects is determined to prioritize for measurement. When the configuration message indicates only a single NR measurement object, the NR measurement object may be determined as the prioritized measurement object (i.e., the first measurement object). The NR measurement object may be prioritized as long as the configuration message is received prior to expiration of the timer.

In some embodiments, it is determined that the plurality of measurement objects include two or more NR measurement objects. In these embodiments, and as described in greater detail in the flowcharts illustrated in FIGS. 21A-B, 24 and 25, additional steps may be utilized to determine which of the two or more NR measurement objects to prioritize for measurement. For example, in some embodiments it may be determined whether the UE is in a high throughput scenario. When it is determined that the UE is in a high throughput scenario, the measurement object with the highest bandwidth (from among the two or more NR measurement objects) may be prioritized as the first measurement object. Conversely, when it is determined that the UE is not in the high throughput scenario, the measurement object with the lowest bandwidth (from among the two or more NR measurement objects) may be prioritized as the first measurement object.

Alternatively or additionally, high priority measurement object may be determined based on the frequency ranges of the two or more NR measurement objects. For example, NR measurement objects typically involve either frequency range 1 (FR1), which runs from approximately 410 MHz to 7125 MHz or frequency range 2 (FR2), which runs from approximately 24250 MHz to 52600 MHz. Based on various considerations (as shown in greater detail in FIGS. 24 and 25), either of FR1 or FR2 may be considered higher priority.

At 708, the first measurement object is measured during a first measurement gap prior to measuring one or more second measurement objects of the plurality of measurement objects. The first measurement object may be measured a number of times up to the determined maximum counter value (e.g., it may be measured repeatedly until a measurement is successful, up to the maximum number of times).

At 710, a measurement report is provided to the serving cell specifying the measurement of the first measurement object. After providing the measurement report, the UE may proceed to measure the remaining measurement objects indicated in the configuration message, and to provide those measurements in a subsequent measurement report.

FIGS. 10-25—Additional Description

FIGS. 10-25 provide additional description and detail related to the described embodiments.

Figure 10:
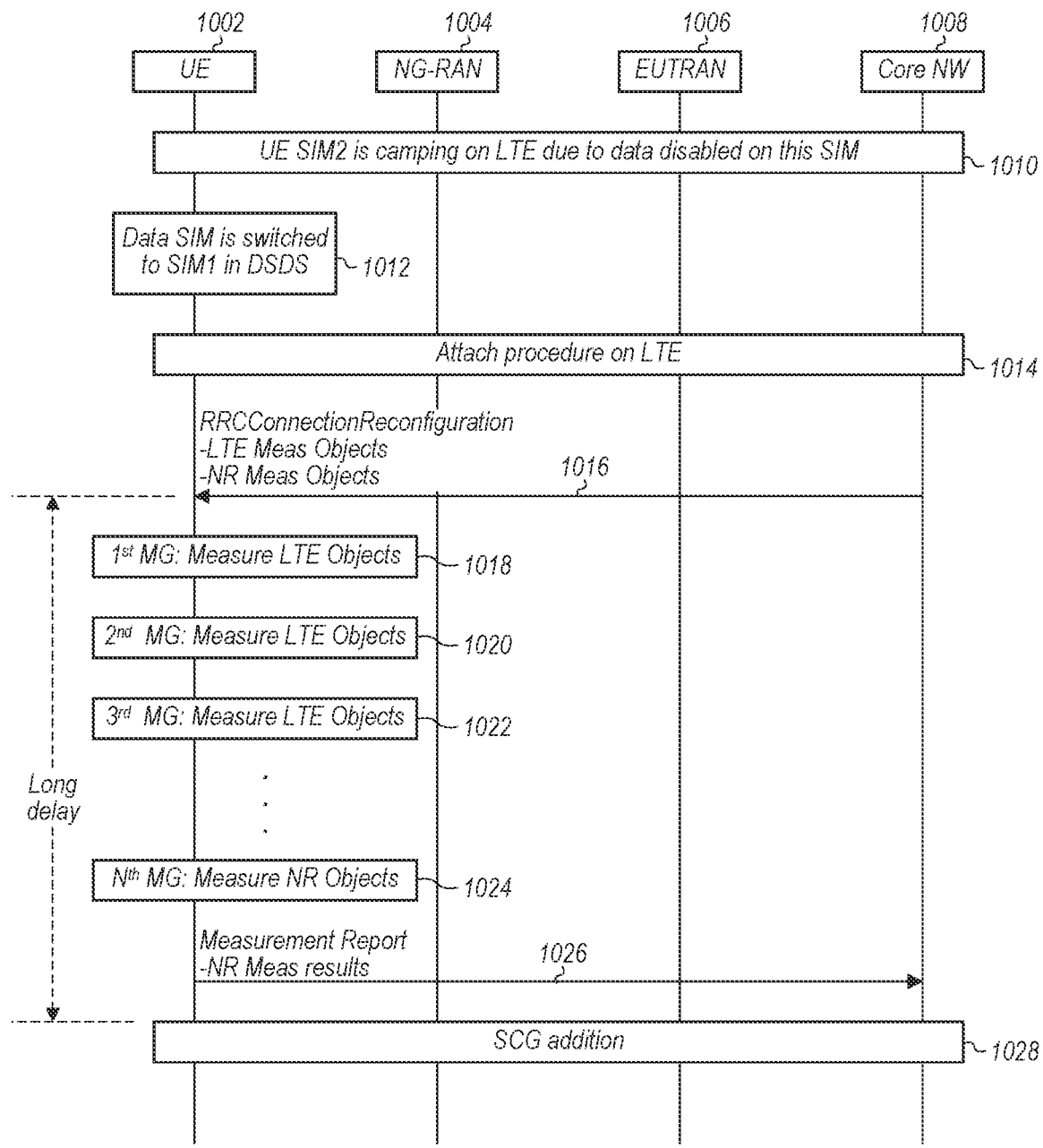
FIG. 10 is a communication flow diagram illustrating a method for performing measurements during a subscriber identity module (SIM) switch, according to the prior art.

FIG. 10 is a communication flow diagram illustrating a method for performing measurements during a subscriber identity module (SIM) switch, according to the prior art. As shown, a plurality of LTE measurement objects is measured prior to measuring the NR measurement object(s), leading to a long delay before the UE provides a measurement report with the NR measurement result and adds the NR SCG cell.

Figure 11:
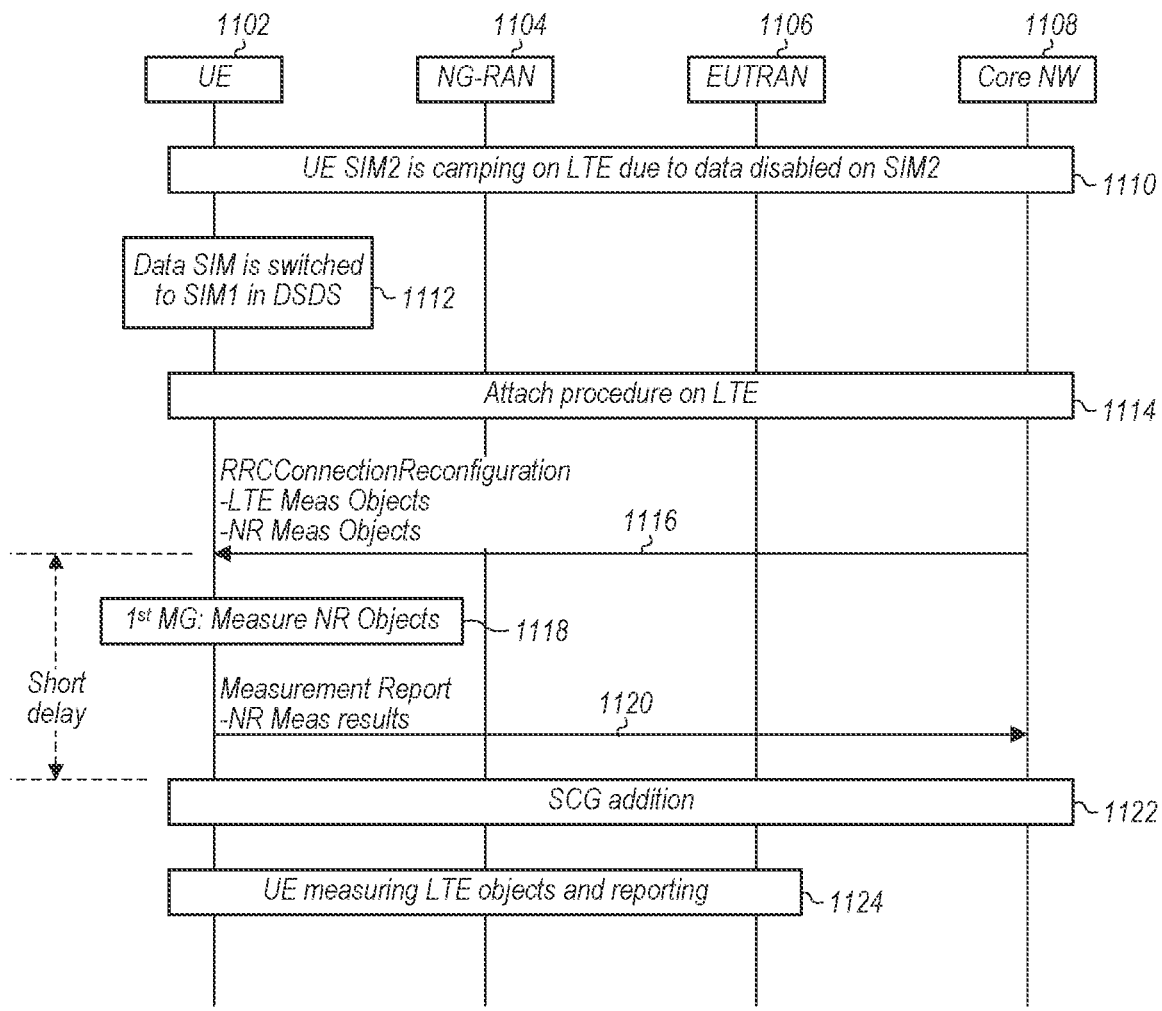
FIG. 11 is a communication flow diagram illustrating a method for performing adaptive measurement prioritization during a SIM switch, according to some embodiments.

FIG. 11 is a communication flow diagram illustrating a method for performing adaptive measurement prioritization during a SIM switch, according to some embodiments. As shown, by measuring the NR measurement objects prior to measuring the LTE measurement objects, a shorter delay is obtained before the UE provides the measurement report and adds the NR SCG cell. LTE measurements are performed after adding the NR SCG cell.

Figure 12:
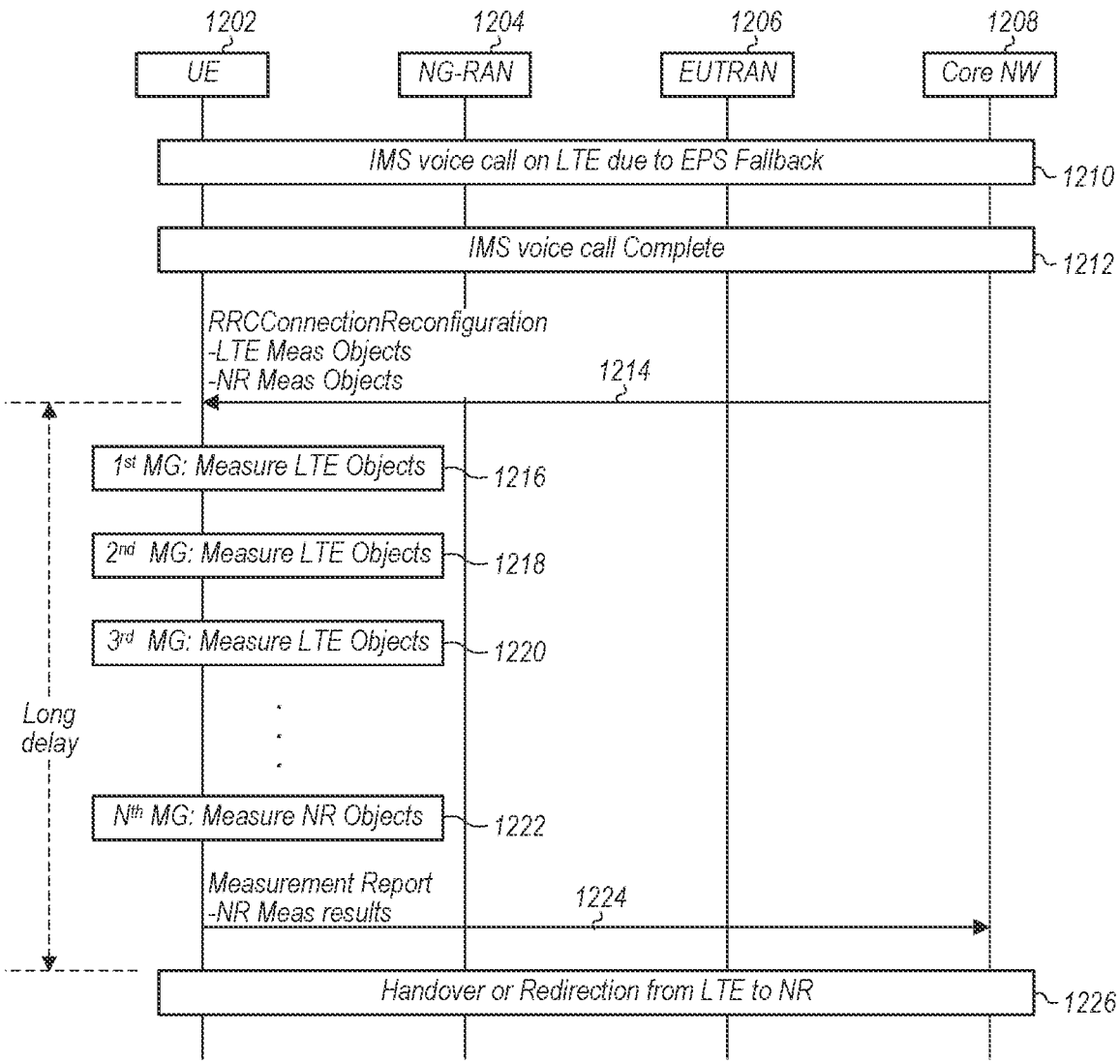
FIG. 12 is a communication flow diagram illustrating a method for performing measurements during Evolved Packet System (EPS) fallback, according to the prior art.

FIG. 12 is a communication flow diagram illustrating a method for performing measurements during Evolved Packet System (EPS) fallback, according to the prior art. As shown, a plurality of LTE measurement objects is measured prior to measuring the NR measurement object(s), leading to a long delay before the UE provides a measurement report with the NR measurement result and performs a handover or redirection from LTE to NR.

Figure 13:
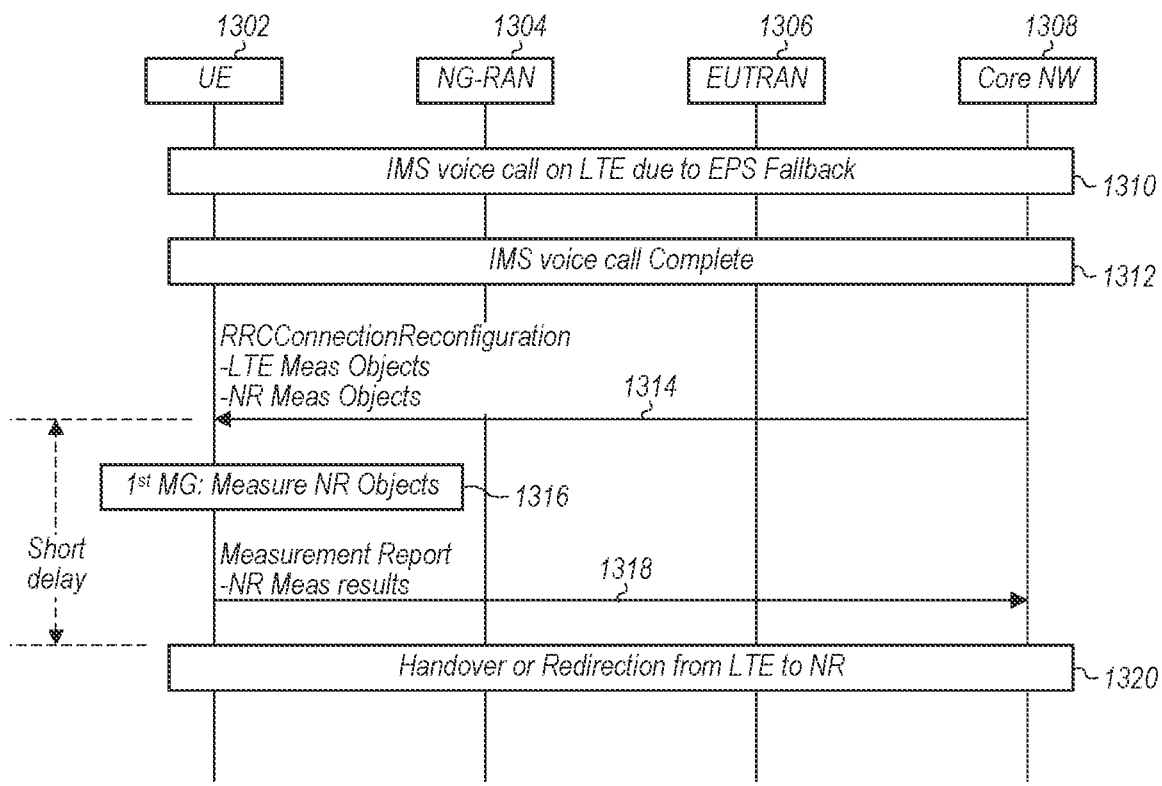
FIG. 13 is a communication flow diagram illustrating a method for performing adaptive measurement prioritization during EPS fallback, according to some embodiments.

FIG. 13 is a communication flow diagram illustrating a method for performing adaptive measurement prioritization during EPS fallback, according to some embodiments. As shown, by measuring the NR measurement objects prior to measuring the LTE measurement objects, a shorter delay is obtained before the UE provides the measurement report and performs a handover or redirection from LTE to NR.

Figure 14:
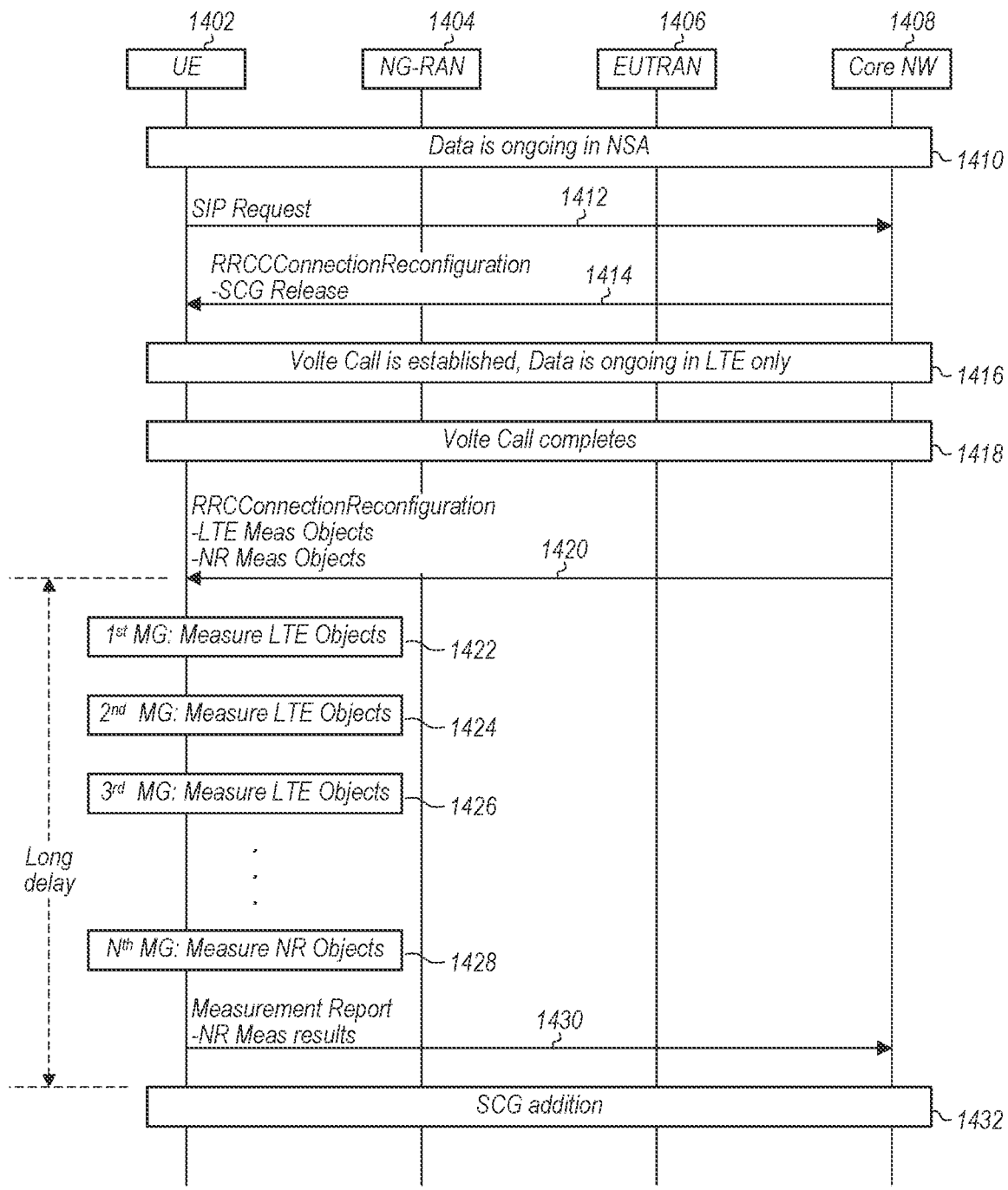
FIG. 14 is a communication flow diagram illustrating a method for performing measurements after completing a voice-over LTE (VoLTE) call, according to the prior art.

FIG. 14 is a communication flow diagram illustrating a method for performing measurements after completing a voice-over LTE (VoLTE) call, according to the prior art. As shown, a plurality of LTE measurement objects is measured prior to measuring the NR measurement object(s), leading to a long delay before the UE provides a measurement report with the NR measurement result and adds the NR SCG cell.

Figure 15:
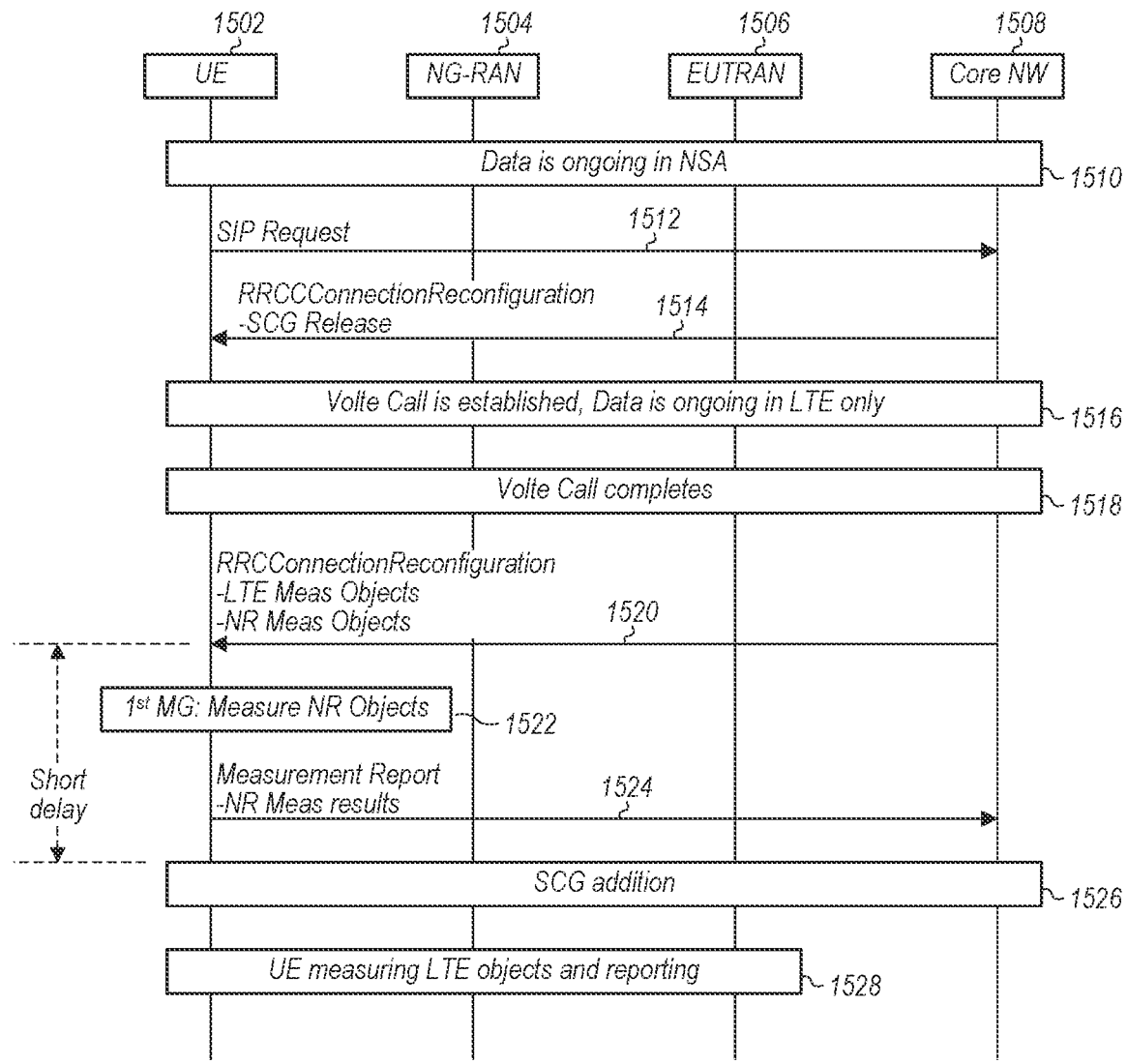
FIG. 15 is a communication flow diagram illustrating a method for performing adaptive measurement prioritization after completing a VoLTE call, according to some embodiments.

FIG. 15 is a communication flow diagram illustrating a method for performing adaptive measurement prioritization after completing a VoLTE call, according to some embodiments. As shown, by measuring the NR measurement objects prior to measuring the LTE measurement objects, a shorter delay is obtained before the UE provides the measurement report and adds the NR SCG cell. LTE measurements and reporting are performed after adding the NR SCG cell.

Figure 16:
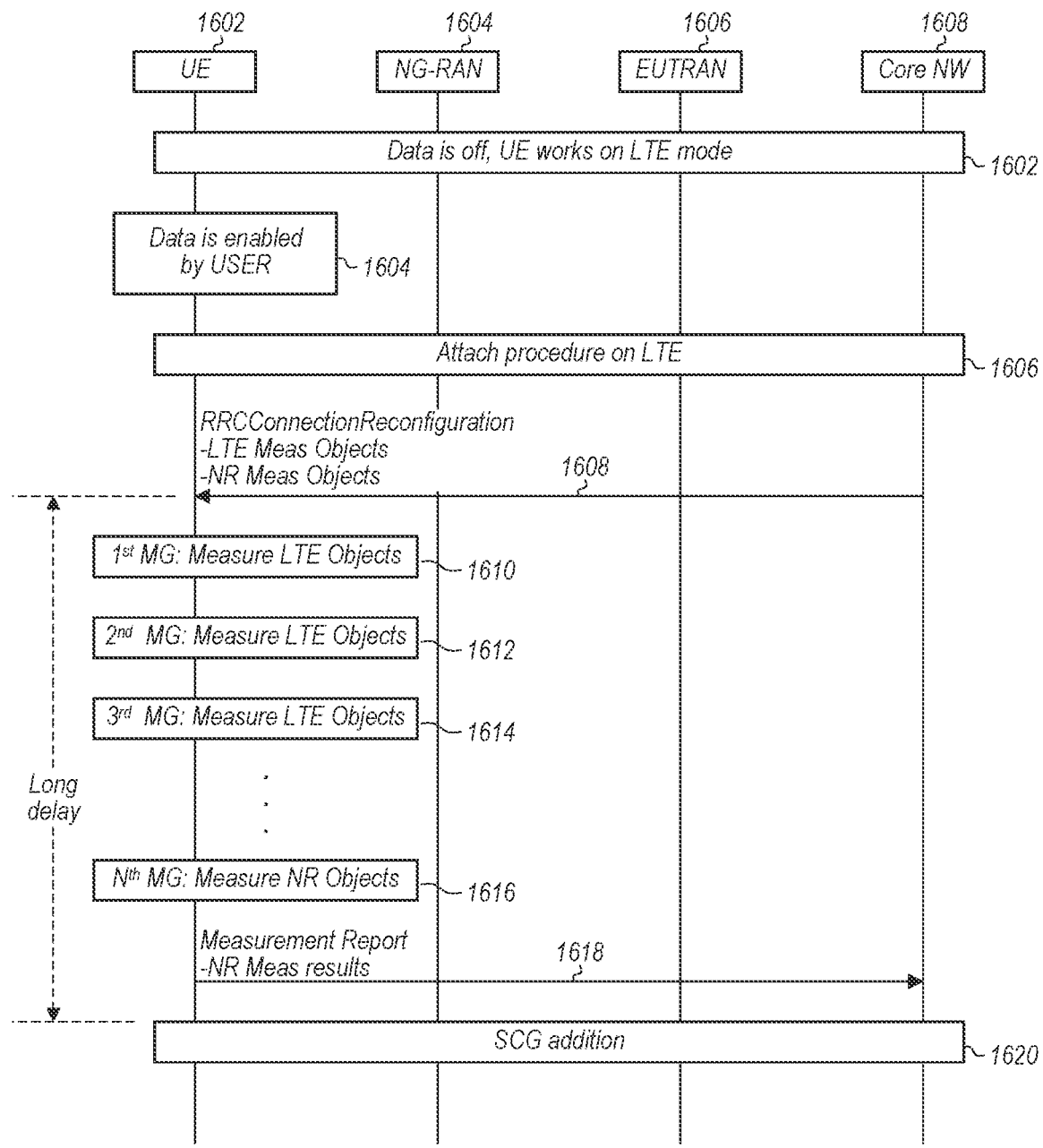
FIG. 16 is a communication flow diagram illustrating a method for performing measurements after enabling data, according to the prior art.

FIG. 16 is a communication flow diagram illustrating a method for performing measurements after enabling data, according to the prior art. As shown, a plurality of LTE measurement objects is measured prior to measuring the NR measurement object(s), leading to a long delay before the UE provides a measurement report with the NR measurement result and adds the NR SCG cell.

Figure 17:
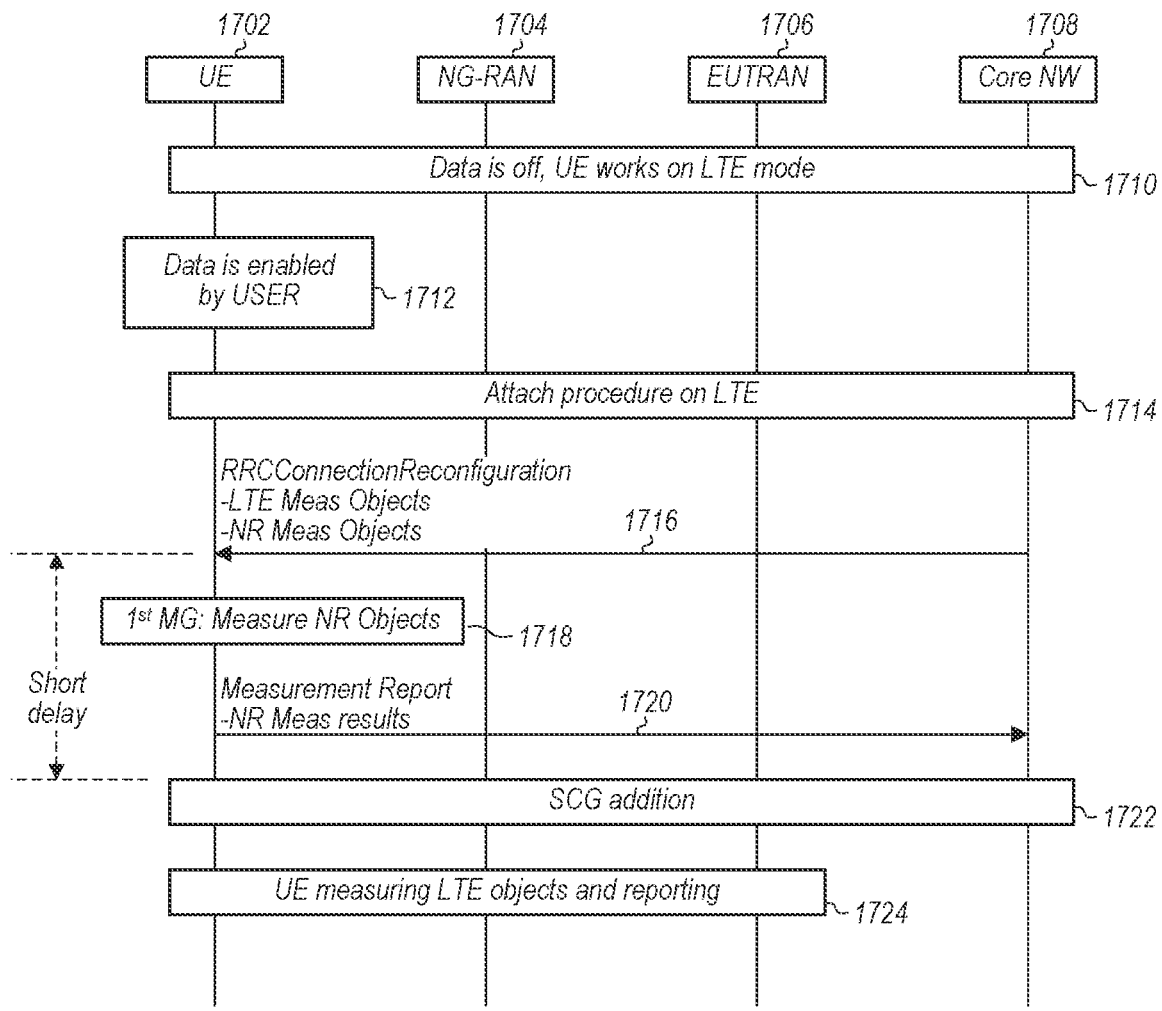
FIG. 17 is a communication flow diagram illustrating a method for performing adaptive measurement prioritization after enabling data, according to some embodiments.

FIG. 17 is a communication flow diagram illustrating a method for performing adaptive measurement prioritization after enabling data, according to some embodiments. As shown, by measuring the NR measurement objects prior to measuring the LTE measurement objects, a shorter delay is obtained before the UE provides the measurement report and adds the NR SCG cell. LTE measurements and reporting are performed after adding the NR SCG cell.

Figure 18:
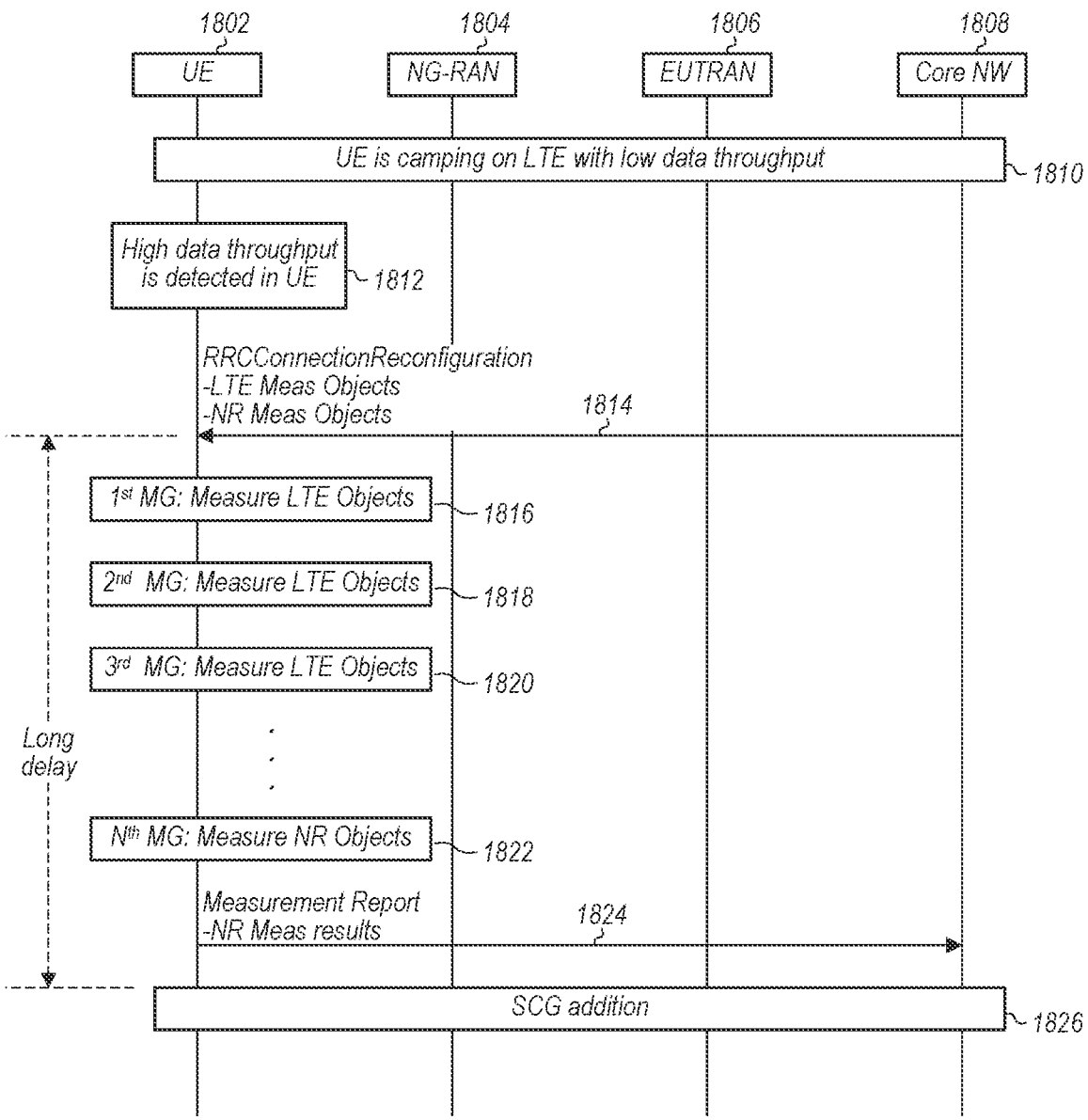
FIG. 18 is a communication flow diagram illustrating a method for performing measurements in a high data throughput scenario, according to the prior art.

FIG. 18 is a communication flow diagram illustrating a method for performing measurements in a high data throughput scenario, according to the prior art. As shown, a plurality of LTE measurement objects is measured prior to measuring the NR measurement object(s), leading to a long delay before the UE provides a measurement report with the NR measurement result and adds the NR SCG cell.

Figure 19:
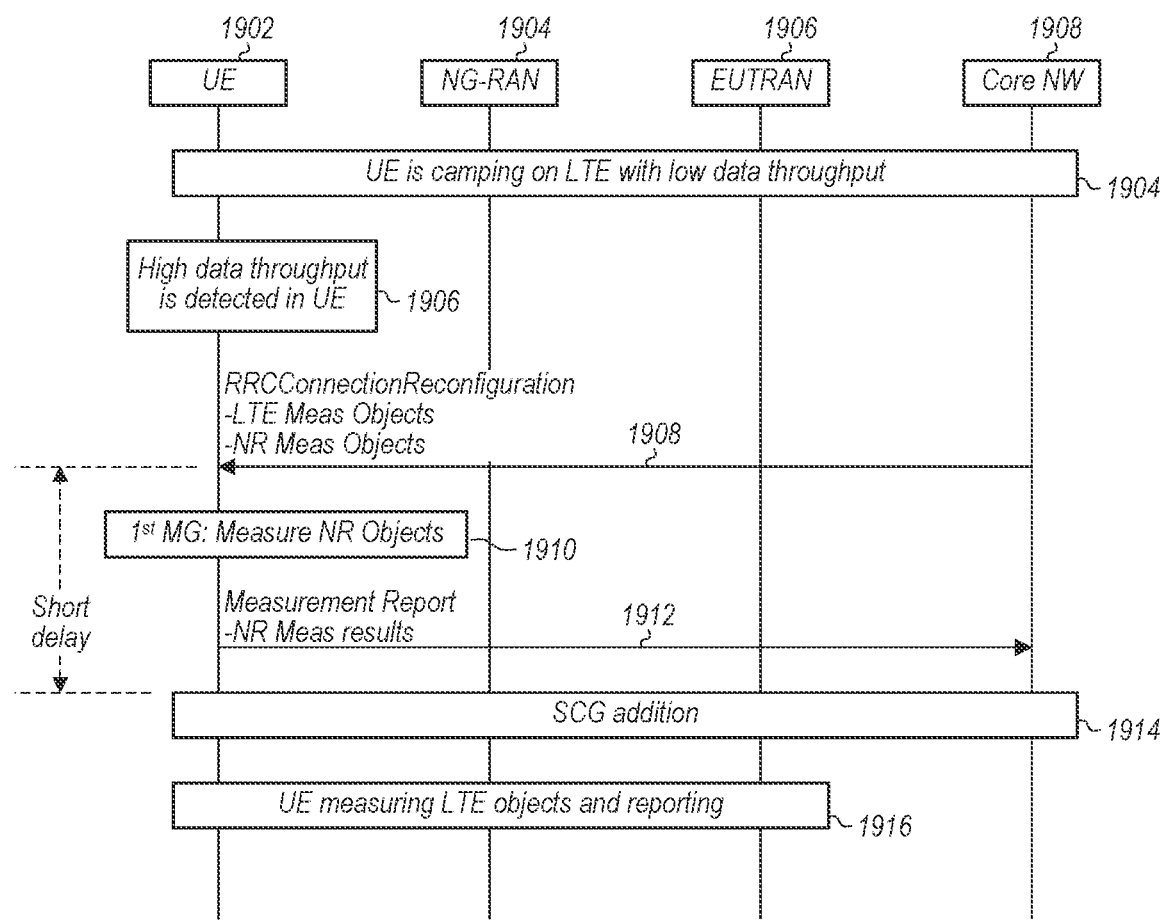
FIG. 19 is a communication flow diagram illustrating a method for performing adaptive measurement prioritization in a high data throughput scenario, according to some embodiments.

FIG. 19 is a communication flow diagram illustrating a method for performing adaptive measurement prioritization in a high data throughput scenario, according to some embodiments. As shown, by measuring the NR measurement objects prior to measuring the LTE measurement objects, a shorter delay is obtained before the UE provides the measurement report and adds the NR SCG cell. LTE measurements and reporting are performed after adding the NR SCG cell.

FIGS. 20A-B are a non-limiting examples of NR Measurement Object (MeasObject) prioritization tables for four distinct NR measurement objects, according to some embodiments. As illustrated, each NR Measurement Object has an absolute radio frequency channel number (ARFCN) identifier, a subcarrier spacing (SCS), a frequency range (either FR1 or FR2), a bandwidth, an either per-UE (FIG. 20A) or per-FR (FIG. 20B) measurement gap length, and a priority verdict (i.e., priority ranking). The priority rankings shown in FIGS. 20A-B may be determined, for example, by the flowchart methods shown in FIGS. 21A-B, 24 and 25. A table such as the ones illustrated in FIGS. 20A-B may be created and populated with a new row every time a new NR SCG is added by the UE.

In some embodiments, when the NR network is a home public land mobile network (HPLMN), an entry in prioritization table may not be deleted until a SIM card is changed or the UE attaches to a different carrier. Accordingly, the table may accumulate additional NR measurement object entries until the SIM card is changed or the UE attached to a different carrier. For embodiments where the NR network is a visitor public land mobile network (VPLMN), the entry in the database may be deleted when the UE moves back to the HPLMN, provided it's not in a frequently visited country (e.g., provided the VPLMN is not on a frequently visited country list).

Figure 21A:
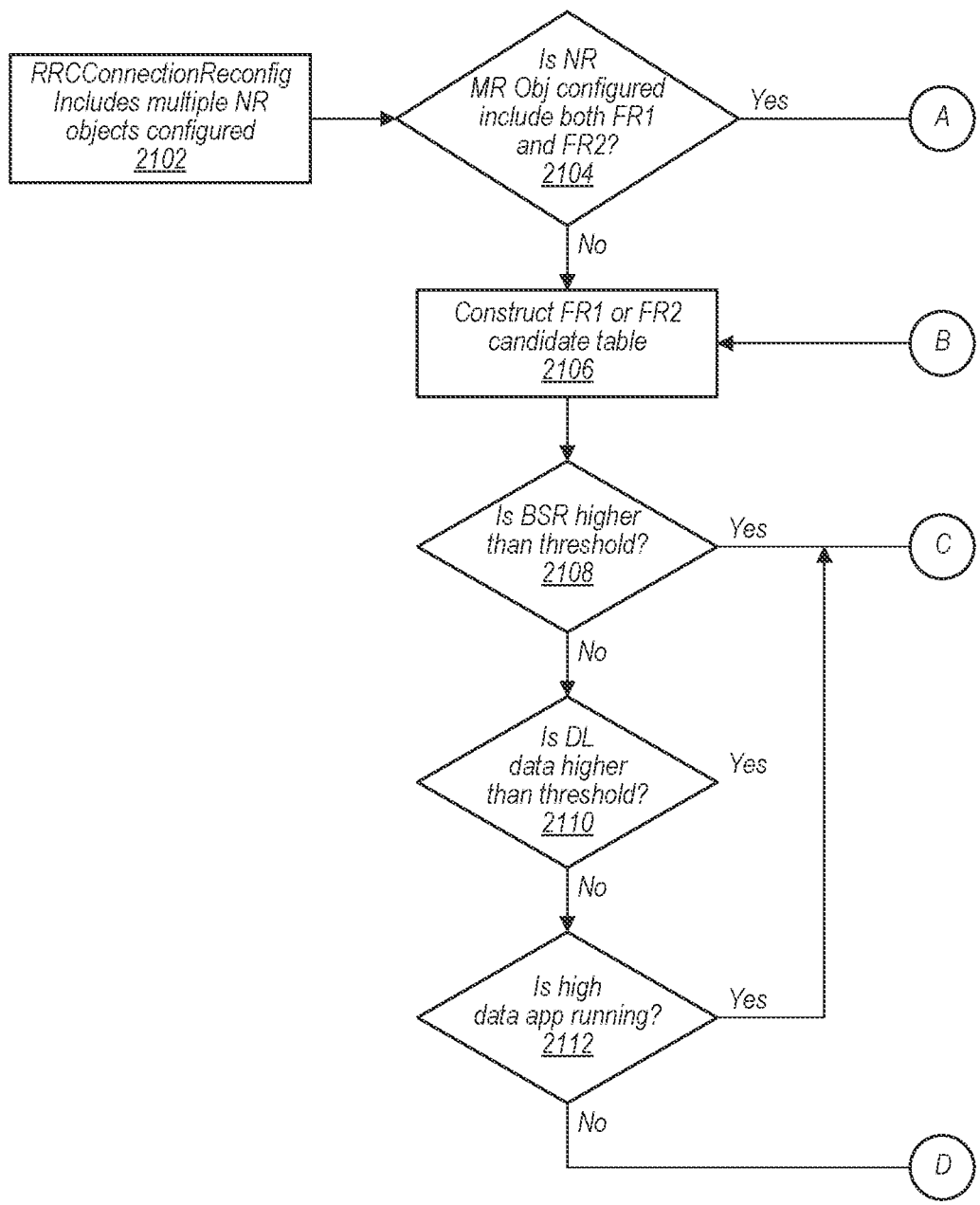
FIGS. 21A-B are a flowchart diagram illustrating a method for adaptive measurement object prioritization when there are multiple NR measurement objects, according to some embodiments.
Figure 21B:
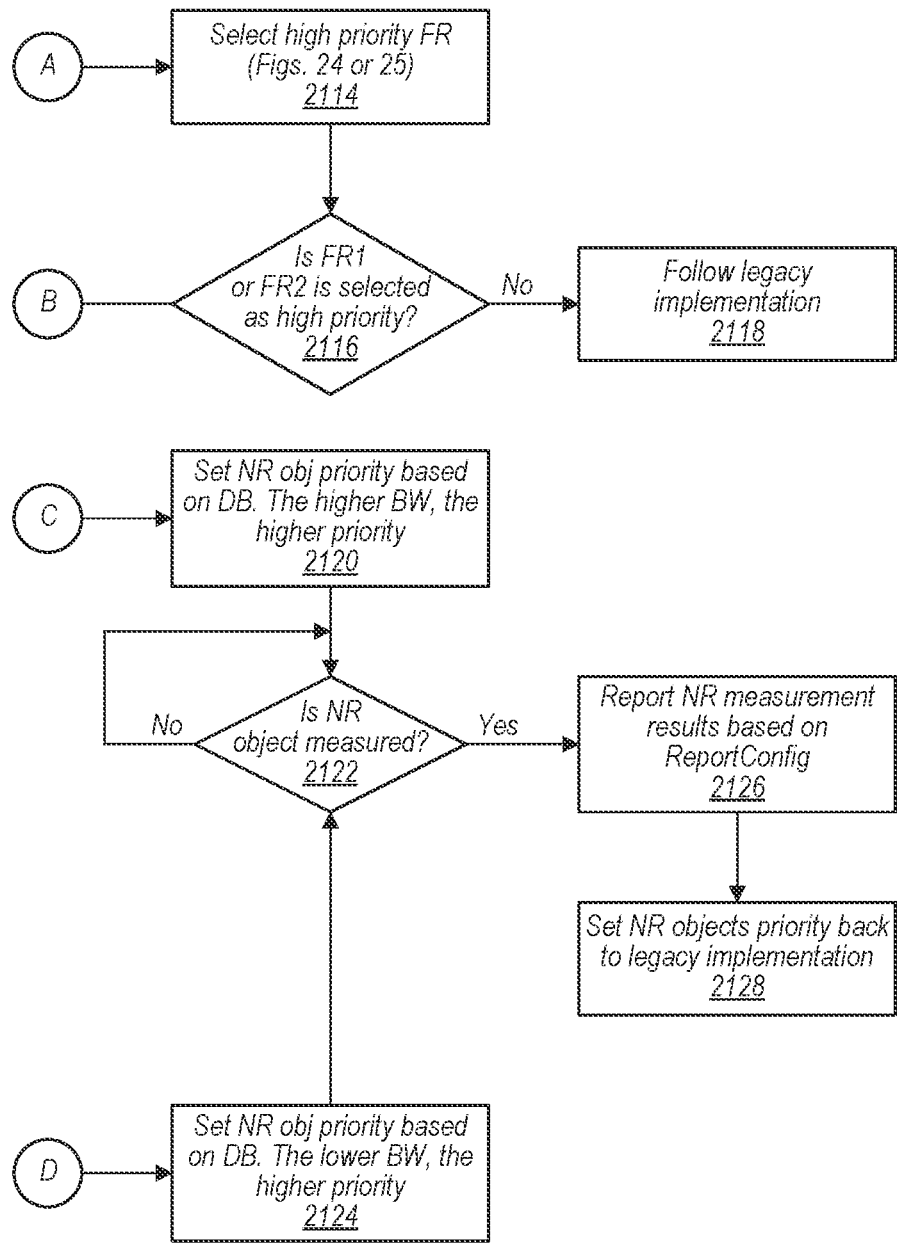

FIGS. 21A-B are a flowchart diagram illustrating a method for adaptive measurement object prioritization when there are multiple NR measurement objects, according to some embodiments. FIGS. 21A-B describe a method whereby various aspects of the multiple NR measurement objects are considered to determine which NR measurement object will be prioritized to be measured first. For example, when it is determined at step 2102 that a RRCConnnection-Reconfiguration message received from the network includes multiple NR measurement object (e.g., from step 822 of FIG. 8), it may be determined if the NR measurement objects include objects with both frequency range 1 (FR1) and frequency range 2 (FR2) at step 2104. If so, at 2114, the higher priority FR may be selected, for example, according to the flowchart diagrams of either FIG. 24 or 25. If it is determined that neither FR1 or FR2 is higher priority at step 2116, the legacy implementation may be utilized at 2118, whereby no FR measurement object is prioritized. Alternatively, if FR1 or FR2 is determined to be higher priority, a candidate table such as those shown in FIGS. 22 and 23 may be constructed for the higher priority FR NR measurement objects.

At 2108-2112, it may be determined if either a BSR indicates uplink data is higher than a predetermined threshold, DL data throughput is higher than a threshold, and/or if a high-data application is running on the UE. If any of these determinations is positive, at 2120, the NR measurement object priority may be determined based on the candidate table/database, wherein the highest bandwidth (BW) object is designated higher priority for measurement.

If the determinations at steps 2108-2112 are all negative, at 2124, the NR measurement object priority may be determined based on the candidate table/database, wherein the lowest bandwidth (BW) object is designated higher priority for measurement.

After the high-priority NR object is determined, at 2122 the prioritized NR object may be measured (potentially up to a maximum threshold number of times, until it is successfully measured or the maximum threshold number of attempts is reached). After measurement is complete, at 2126, the NR measurement results are reported to the network, and at 2128 the priority adjustment is returned to the legacy implementation (i.e., any remaining LTE measurement objects may be measured and reported.

FIG. 22 is a FR1 candidate table, according to some embodiments. When it is determined that FR1 is prioritized over FR2 (e.g., through the method flowcharts described in either of FIG. 24 or 25), a FR1 candidate table such as the one illustrated in FIG. 22 may be constructed at step 2106 of FIG. 21A and consulted to determine the priority NR measurement object. Said another way, the NR measurement objects included in the FR1 candidate table may serve as candidates to be selected from for prioritization according to the criteria described at steps 2108-2128 of FIGS. 21A-B.

FIG. 23 is a frequency range 2 (FR2) candidate table, according to some embodiments. When it is determined that FR2 is prioritized over FR1 (e.g., through the method flowcharts described in either of FIG. 24 or 25), a FR2 candidate table such as the one illustrated in FIG. 23 may be constructed at step 2106 of FIG. 21A and consulted to determine the priority NR measurement object. Said another way, the NR measurement objects included in the FR2 candidate table may serve as candidates to be selected from for prioritization according to the criteria described at steps 2108-2128 of FIGS. 21A-B.

Figure 24:
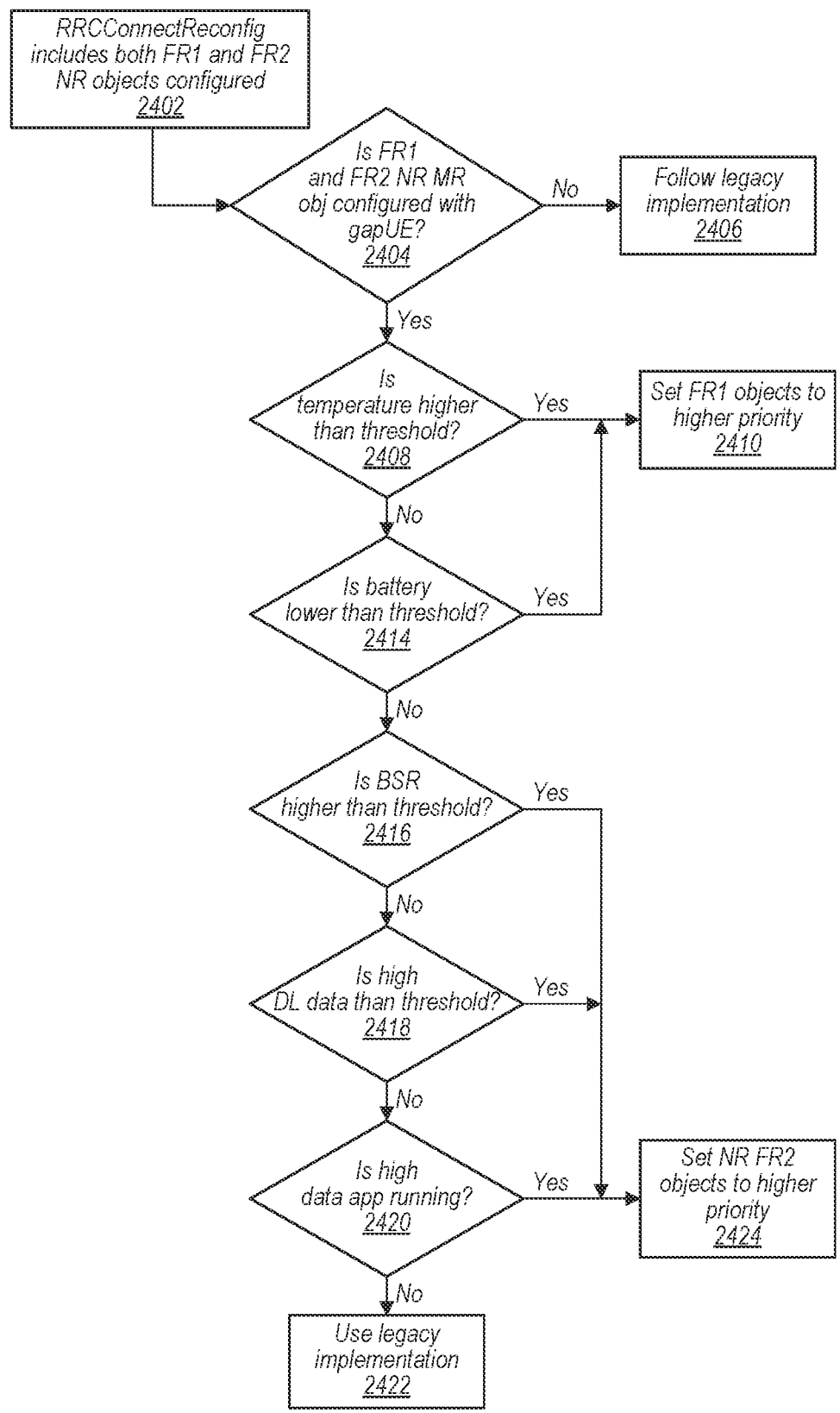
FIG. 24 is a flowchart diagram illustrating a method to determine frequency range priority based on temperature, battery level, and data throughput, according to some embodiments.

FIG. 24 is a flowchart diagram illustrating a method to determine frequency range priority based on temperature, battery level, and data throughput, according to some embodiments. For example, from step 2114 of FIG. 21, it may be determined if either a temperature of the UE is above a threshold (2408) or a battery level of the UE is below a threshold (2414). If either of these determinations is positive, FR1 may be selected as the higher priority FR over FR2.

If both the determinations 2408 and 2414 are negative, it may be determined if either a BSR indicates uplink data is higher than a predetermined threshold (2414), DL data throughput is higher than a threshold (2418), and/or if a high-data application is running on the UE (2420). Note that the thresholds used in steps 2416 and 2418 may be the same or different from the thresholds used in steps 2108 and 2110 of FIG. 21A. For example, the BSR and/or DL data throughput thresholds for steps 2416 and 2418, respectively, may be higher than the corresponding thresholds for steps 2108 and 2110. If any of the determinations 2416-2420 are positive, FR2 may be selected as the higher priority FR over FR2. Conversely, if each of the determinations 2416-2420 are negative, the legacy implementation may be utilized where neither FR1 or FR2 is prioritized (i.e., a "no" determination may be made at step 2116 of FIG. 21B).

Figure 25:
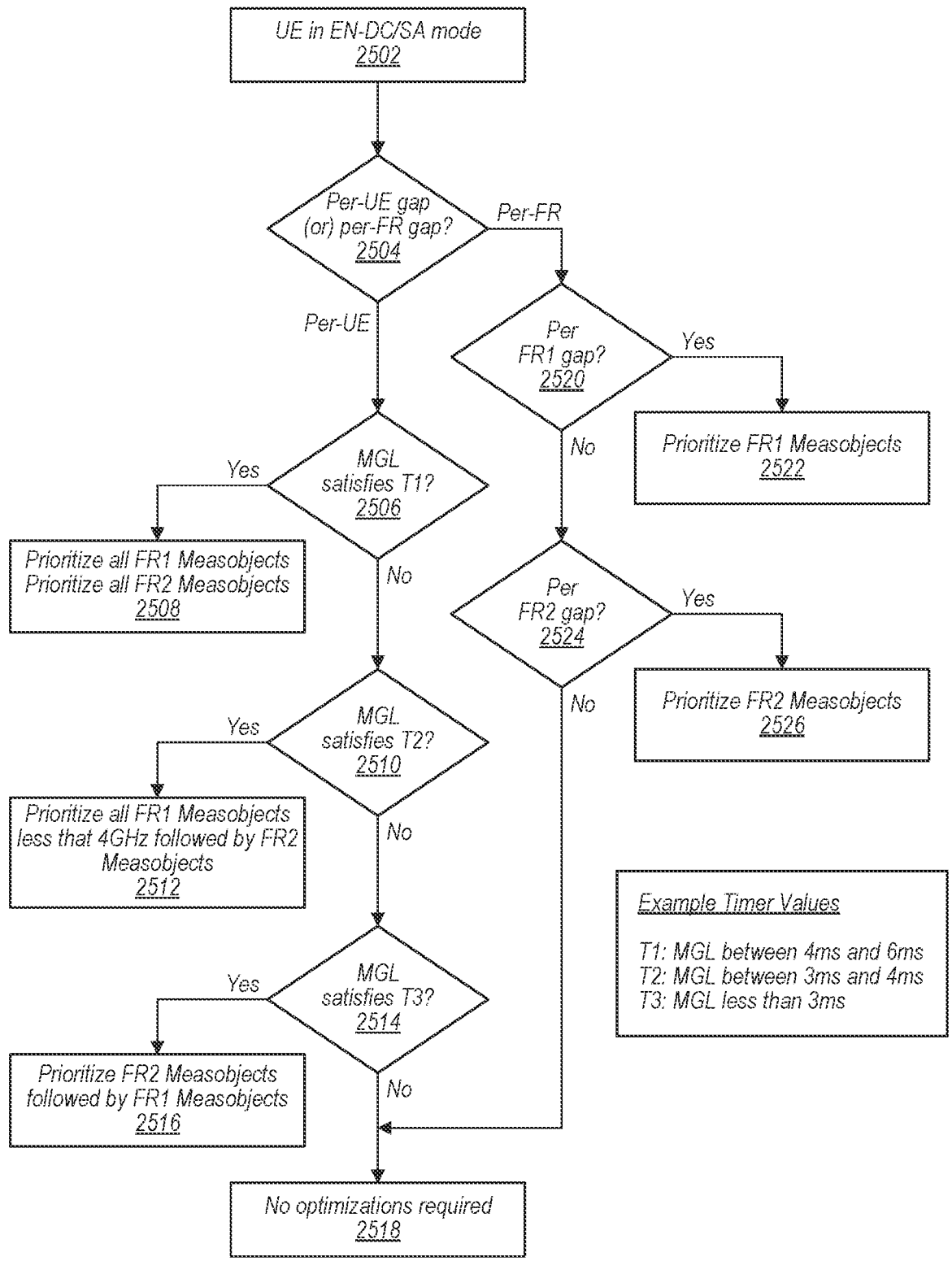
FIG. 25 is a flowchart diagram illustrating a method to determine frequency range priority based on measurement gap length, according to some embodiments.

FIG. 25 is a flowchart diagram illustrating a method to determine frequency range priority based on measurement gap length, according to some embodiments. At 2504, it is determined whether the NR measurement objects are configured with per-FR a per-UE measurement gap lengths (MGLs).

When it is determined that the NR objects include per-UE MGLs (e.g., from a measurement object table such as the one shown in FIG. 20A), it is then sequentially determined at steps 2506, 2510 and 2514 whether the MGL satisfies one of three different time ranges T1-T3. For example, it is first determined whether any MGL of the NR objects satisfies T1. If no MGL satisfies T1, it is determined whether any MGL satisfies T2, followed by T3 (if T2 is not satisfied). One example of the time ranges T1-T3 is illustrated in FIG. 25, although these specific ranges are exemplary only and other time ranges may also be used, as desired. The first "yes" determination from steps 2506, 2510 and 2514 will lead to either prioritizing all FR1 objects (2508), prioritizing all FR1 objects less than a particular bandwidth (4GHz in this example) (2512), or prioritizing all FR2 objects (2516). If none of the MGLs of the NR objects satisfy any of T1-T3, neither FR1 or FR2 will be prioritized at 2518.

When it is determined that the NR objects are configured with per-FR MGLs, it is then determined at steps 2520 and 2524 whether the MGLs include a per-FR1 gap (2520), in which case FR1 objects are prioritized over FR2 at 2522. If the MGLs do not include a per-FR1 gap, it is determined whether they include a pre-FR2 gap at step 2524, in which case FR2 objects are prioritized over FR1 at 2526. If each of the determinations 2520 and 2524 are negative, neither FR1 nor FR2 may be prioritized at step 2518.

In the following further exemplary embodiments are provided.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
  a processor configured to cause a wireless device to:
    implement adaptive measurement object prioritization responsive to determining that a trigger condition has occurred, wherein implementing the adaptive measurement object prioritization comprises initiating a timer;
    receive a configuration message from a serving cell of a cellular base station through a wireless link, wherein the configuration message indicates a plurality of measurement objects;
    determine a first measurement object of the plurality of measurement objects to prioritize for measurement, wherein determining the first measurement object to prioritize for measurement is performed at least in part in response to receiving the configuration message from the cellular base station prior to expiration of the timer;

measure the first measurement object during a first measurement gap prior to measuring one or more second measurement objects of the plurality of measurement objects; and provide a measurement report to the serving cell specifying a measurement result of the first measurement object.

2. The apparatus of claim 1,
wherein a duration of the timer is determined based at least in part on a serving cell frequency of the serving cell, wherein a lower serving cell frequency determines a higher timer duration than a higher serving cell frequency.

3. The apparatus of claim 1,
wherein a duration of the timer is determined based at least in part on a received-signal-to-received-power (RSRP) ratio of the serving cell, wherein a lower RSRP ratio determines a lower timer duration than a higher RSRP ratio.

4. The apparatus of claim 3,
wherein the duration of the timer is determined to be zero when the RSRP ratio is lower than a threshold value.

5. The apparatus of claim 1,
wherein implementing the adaptive measurement object prioritization comprises setting a maximum number of measurements to perform on the first measurement object, wherein measuring the first measurement object is performed up to the maximum number of times,
wherein the maximum number of measurements is determined based at least in part on a serving cell frequency of the serving cell, wherein a lower serving cell frequency determines a higher maximum number of measurements than a higher serving cell frequency.

6. The apparatus of claim 1,
wherein implementing the adaptive measurement object prioritization comprises setting a maximum number of measurements to perform on the first measurement object, wherein measuring the first measurement object is performed up to the maximum number of times,
wherein the maximum number of measurements is determined based on a received-signal-to-received-power (RSRP) ratio of the serving cell, wherein a lower RSRP ratio determines a lower the maximum number of measurements than a higher RSRP ratio.

7. The apparatus of claim 6,
wherein the maximum number of measurements is determined to be zero when the RSRP ratio is lower than a threshold value.

8. The apparatus of claim 1,
wherein the trigger condition comprises one of:
the wireless device switching from using a first non-data subscriber identity module (SIM) to a second data SIM;
an evolved packet system (EPS) fallback procedure after completion of a Long Term Evolution (LTE) voice call;
completion of a voice-over LTE (VOLTE) call;
the wireless device switching from a data-off mode to a data-on mode;
a determination that download data throughput exceeds a throughput threshold; or
a determination that a buffer status report (BSR) exceeds a BSR threshold.

9. The apparatus of claim 1,
wherein the first measurement object is associated with a secondary cell group (SCG) utilizing a $5^{th}$ Generation New Radio (5G NR) radio access technology (RAT), and
wherein the one or more second measurement objects are associated with a Long Term Evolution (LTE) RAT.

10. The apparatus of claim 1,
wherein the processor is further configured to cause the wireless device to:
determine that the plurality of measurement objects comprise two or more $5^{th}$ Generation New Radio (5G NR) measurement objects, wherein the two or more 5G NR measurement objects include the first measurement object;
based at least in part on determining that the plurality of measurement objects comprise the two or more 5G NR measurement objects, determine whether the wireless device is in a high throughput scenario;
wherein determining to prioritize the first measurement object for measurement comprises determining that the first measurement object comprises a higher bandwidth than other measurement objects of the two or more 5G measurement objects when it is determined that the wireless device is in the high throughput scenario, and
wherein determining to prioritize the first measurement object for measurement comprises determining that the first measurement object comprises a lower bandwidth than other measurement objects of the two or more 5G measurement objects when it is determined that the wireless device is not in the high throughput scenario.

11. The apparatus of claim 1,
wherein the processor is further configured to cause the wireless device to:
determine that the plurality of measurement objects comprise two or more $5^{th}$ Generation New Radio (5G NR) measurement objects, wherein the two or more 5G NR measurement objects include the first measurement object;
wherein determining to prioritize the first measurement object of the plurality of measurement objects for measurement comprises determining that the first measurement object comprises a higher priority frequency range than other measurement objects of the two or more 5G measurement objects.

12. The apparatus of claim 11,
wherein the processor is further configured to cause the wireless device to:
determining whether a temperature of the wireless device or is higher than a temperature threshold or a battery level of the wireless device is below a battery level threshold;
responsive to determining that the temperature of the wireless device or is higher than the temperature threshold or the battery level of the wireless device is below the battery level threshold, setting frequency range 1 (FR1) as the higher priority frequency range;
determining whether a buffer status report (BSR) of the wireless device or is higher than a BSR threshold or a downlink data throughput of the wireless device is higher than a throughput threshold;
responsive to determining that BSR is higher than the BSR threshold or the downlink data throughput is higher than the throughput threshold, setting frequency range 2 (FR2) as the higher priority frequency range.

13. The apparatus of claim 11,
wherein determining that the first measurement object comprises the higher priority frequency range comprises:
   determining whether two or more 5G NR measurement objects are configured with per-wireless device or per-frequency range (per-FR) measurement gap lengths (MGLs)
   based on determining that the two or more 5G NR measurement objects are configured with the per-wireless device MGLs, determining the higher priority frequency range based on timer values of the per-wireless device MGLs; and
   based on determining that the two or more 5G NR measurement objects are configured with the per-FR MGLs, prioritizing frequency range 1 (FR1) when the per-FR MGLs comprise per-FR1 MGLs, and prioritizing frequency range 2 (FR2) when the per-FR MGLs comprise per-FR2 MGLs and do not comprise per-FR1 MGLs.

14. A wireless user equipment (UE), comprising:
an antenna;
a radio operably coupled to the antenna; and
a processor operably coupled to the radio, wherein the wireless UE is configured to:
   implement adaptive measurement object prioritization responsive to determining that a trigger condition has occurred, wherein implementing the adaptive measurement object prioritization comprises initiating a timer;
   receive a configuration message from a serving cell of a cellular base station through a wireless link, wherein the configuration message indicates a plurality of measurement objects;
   determine a first measurement object of the plurality of measurement objects to prioritize for measurement, wherein determining the first measurement object to prioritize for measurement is performed at least in part in response to receiving the configuration message from the cellular base station prior to expiration of the timer;
   measure the first measurement object during a first measurement gap prior to measuring one or more second measurement objects of the plurality of measurement objects; and
   provide a measurement report to the serving cell specifying a measurement result of the first measurement object.

15. The wireless UE of claim 14,
wherein a duration of the timer is determined based at least in part on one or both of a serving cell frequency of the serving cell and a received-signal-to-received-power (RSRP) ratio of the serving cell, wherein a lower serving cell frequency determines a higher timer duration than a higher serving cell frequency, and wherein a lower RSRP ratio determines a lower timer duration than a higher RSRP ratio.

16. The wireless UE of claim 15,
wherein the duration of the timer is determined to be zero when the RSRP ratio is lower than a threshold value.

17. A method, comprising:
by a wireless user equipment (UE):
   implementing adaptive measurement object prioritization responsive to determining that a trigger condition has occurred, wherein implementing the adaptive measurement object prioritization comprises initiating a timer;
   receiving a configuration message from a serving cell of a cellular base station through a wireless link, wherein the configuration message indicates a plurality of measurement objects;
   determining a first measurement object of the plurality of measurement objects to prioritize for measurement, wherein determining the first measurement object to prioritize for measurement is performed at least in part in response to receiving the configuration message from the cellular base station prior to expiration of the timer;
   measuring the first measurement object during a first measurement gap prior to measuring one or more second measurement objects of the plurality of measurement objects; and
   providing a measurement report to the serving cell specifying a measurement result of the first measurement object.

18. The method of claim 17,
wherein implementing the adaptive measurement object prioritization comprises setting a maximum number of measurements to perform on the first measurement object, wherein measuring the first measurement object is performed up to the maximum number of times,
wherein the maximum number of measurements is determined based at least in part on a serving cell frequency of the serving cell, wherein a lower serving cell frequency determines a higher maximum number of measurements than a higher serving cell frequency.

19. The method of claim 17,
wherein a duration of the timer is determined based at least in part on one or both of a serving cell frequency of the serving cell and a received-signal-to-received-power (RSRP) ratio of the serving cell, wherein a lower serving cell frequency determines a higher timer duration than a higher serving cell frequency, and wherein a lower RSRP ratio determines a lower timer duration than a higher RSRP ratio.

20. The method of claim 19,
wherein the duration of the timer is determined to be zero when the RSRP ratio is lower than a threshold value.

* * * * *